United States Patent [19]
Zufelt et al.

[11] Patent Number: 5,835,025
[45] Date of Patent: Nov. 10, 1998

[54] PORTABLE BATTERY OPERATED POWER MANAGED EVENT RECORDER AND INTERROGATOR SYSTEM

[75] Inventors: Jon E. Zufelt, Canaan; Charles H. Clark, Enfield; Henry H. Harjes, Jr., Etna, all of N.H.

[73] Assignee: U.S. Army Corps of Engineers as represented by the Secretary of the Army, Washington, D.C.

[21] Appl. No.: 856,450

[22] Filed: May 14, 1997

[51] Int. Cl.$^6$ ............................ G08B 23/00; G08C 15/06
[52] U.S. Cl. .................... 340/870.02; 340/580; 340/601; 340/825.31; 73/170.26
[58] Field of Search ............................... 340/825.31, 580, 340/870.02, 601, 540; 73/170.16, 170.26

[56] References Cited

U.S. PATENT DOCUMENTS 5,446,448  8/1995  Zufelt et al. ............................ 340/580
5,602,536  2/1997  Henderson et al. ............... 340/825.31

Primary Examiner—Michael Horabik
Assistant Examiner—Timothy Edwards, Jr.
Attorney, Agent, or Firm—Luther A. Marsh

[57] ABSTRACT

A data acquisition apparatus that includes a recorder device of an event's time and date signified by the opening of an external trigger switching circuit in combination with a complimentary interrogator device for collecting data from the recorder device. The recorder device's components comprise a battery powered source with a power regulator, a processor, a dip-switch identifier, a programmable read only memory, a clock/ calender with random access memory, a timing/control subcircuit interface that connects to the external trigger switching circuit(s) and an output interface port for data transmissions with the interrogator device. The recorder's timing/control subcircuit interface extends battery life by sensing and transmitting electrical pulses through each external trigger switching circuit. The interrogator device is portable and has multiple functional capabilities. This interrogator comprise an regulated battery power source, a processor, a programmable ROM, an event storage RAM, a clock/calender subcircuit, an optional liquid crystal display display, and an input/output interface port to communicate with the recorder device.

10 Claims, 5 Drawing Sheets

PORTABLE BATTERY OPERATED POWER MANAGED EVENT RECORDER AND INTERROGATOR SYSTEM

STATEMENT OF GOVERNMENT INTEREST

The invention described herein may be manufactured and used by or for the United States Government for governmental purposes without the payment of any royalties thereon.

FIELD OF THE INVENTION

The present invention relates to data acquisition apparatus and in particular, to portable battery powered recorder and interrogator devices for acquiring data of events denoted by switch openings. These recorder is intended for remote locations and includes a power management circuit for extended use.

BACKGROUND OF THE INVENTION

There are many instances when an event's time and date are desired observable data but are too difficult or costly to collect due to either environment, remote location or nature of a particular event. Existing methods of collecting such data use expensive data-loggers that monitor electrical circuits or devices. These data-loggers often require reliable AC power for their operation. When such data-loggers include a battery source, these battery sources are large and have limited operational life capabilities due to the data-logger's frequent scan rate. To attain uninterrupted monitoring for at least three months, such scan rates are set at large time cycles with periods at hour intervals making such data-loggers impractical to use. Moreover, typical data-loggers usually include superfluous hardware with complex data storage capabilities intended for elaborate transduced data measurements using voltages, resistances, or currents that are not needed for recording only an event's time and date of occurrence. Finally, these data-loggers usually must be adapted with weather-proof housings for outdoor use and may require irregular maintenance and monitoring.

Examples of such data-loggers include: i) U.S. Pat. 4,229,726 by Denton et al. entitled "Portable Electronic Traffic Event Recorder" which teaches of a battery powered processor based recorder device for traffic analysis use that can be interrogated by a central processor device. A limitation of this device includes limited use for extended time periods since there is no provision for an energy management scheme, thus requiring periodic checks for a low power condition. ii) U.S. Pat. 5,185,700 by Bezoes et al. entitled "Solid State Event Recorder" which teaches of a processor based data acquisition system for trains, planes or mobile units that monitors these platform operating conditions and use either telemetry transmitter units for transmitting data to wayside receivers, a laptop computer for downloading data from this data system or include a removable battery powered memory module in the system. Limitations of this system include either reliance on the mobile platform's main power source or continual monitoring of the memory module for a low power state. This teaching does not include a power management scheme for use in the battery operated memory module for extended use. iii) U.S. Pat. 5,311,449 by Adams entitled "Sterilizable Hand-Held Programmer/Interrogator" which teaches of a medical interrogation device for data communication for a patient's defibrillator device. This device is a processor based unit that can either receive or transmit data to a defibrillator device for analysis by a physician. This device has no power management scheme. iv) U.S. Pat. 5,317,914 by Franco Jr. entitled "Hardened Data Acquisition System" which teaches of a battery powered data recorder device for use in a moving projectile such as an artillery shell. This complex data recorder device includes a regulated power supply with a power shut down feature, but does not teach or suggest of a power management scheme for sensing an event caused by a switched triggering load as provided for by the instant invention. v) U.S. Pat. 5,502,656 by Fulcher et al. entitled "Data Logger Having a RAM that Accepts Electro-Magnetically a Sensor Table and a Sample Table" which teaches of a device for gathering data on fish behavior in open waters by attaching a data-logger to a fish. This device is battery powered and includes a standby battery for maintaining stored memory at low powered states, but does not include a means to shut power off and on to the processor unit.

Examples of devices for managing power of battery operated electronic devices for processor based devices include: i) U.S. Pat. 5,546,590 by Pierce entitled "Powered Down State Machine For PCMCIA Card Applications" which teaches of a PC card hardware based scheme. ii) U.S. Pat. 5,557,191 by Capurka entitled "Apparatus for Minimizing Current Drain in a Battery Powered Data Collector" which teaches of a power management scheme that uses a stimulus device for sensing a load state that is attached to the data collector device.

While the above devices do include power management schemes for longer battery life in a data-logger system, their designs and methods do not provide optimal power conservation as now provided by the instant invention. In particular, Capurka device uses a fixed pulse width with a duty factor determined by characteristics of the delayed one-shot component used therein.

In contrast, the instant invention automatically optimizes the duty factor whose pulse width is a function of the length of an external trigger circuit. When a short occurs across the invention's trigger circuit, the pulse width is at a minimum and is determined by a pulse travel time passing through a timing and control circuit of the timing and control interface which is about 100 nanoseconds. This pulse width increases as the trigger circuit's length increases at about 5 microseconds/mile. For an ice motion detector acting as the external trigger circuit, the pulse width is about 300 nanoseconds which represents a large decrease in duty factor compared to a pulse generated by Capurka's fixed delayed one-shot component. Thus, the instant invention optimally conserves battery power for a given trigger circuit length yielding a many orders of decreased duty factor yielding improved prolonged battery life. In view of the above, there is a need for a portable, inexpensive and self-contained event/date based event data acquisition system that can operate in adverse conditions and be left unattended for months.

SUMMARY OF THE INVENTION

The invention is a data acquisition apparatus that includes a recorder device of an event's time and date signified by the opening of an external trigger switching circuit in combination with a complimentary interrogator device for collecting data from the recorder device.

The recorder device's components comprise a battery powered source with a power regulator, a processor, a dip-switch identifier, a programmable read only memory (ROM), a clock/calender with random access memory (RAM), a timing/control subcircuit interface that connects to the external trigger switching circuit(s) and an output interface port for data transmissions with the interrogator device. The recorder can monitor long-term in extreme weather conditions at subfreezing temperatures. Each recorder device has a dip-switch that uniquely identifies a recorder device when multiple recorder devices are used for data collection. The recorder device is housed in a compact weather-proof housing that can operate for many months. The recorder monitors battery power. When the power is low, the recorder ceases sensing the state of each external trigger switching circuit. This low power condition is sufficient for maintaining events stored in memory. The recorder can use AA sized batteries. Operationally, the recorder stores the opening event's date and time of normally closed external trigger switching circuit(s) and can record multiple events, e.g. repeated opening of a door equipped with a magnetic switch. The identification (ID) number is enabled by a dip-switch setting in each recorder. This ID is stored with the time and date of each event, thus a series of synchronized recorders can be placed in the field to monitor the progression of unsteady events, e.g., the recorder can monitor an event's time and date of:i) a flood wave passage down a river, ii) a progression of a river ice breakup event, or iii) a door opening occurrence by a guard.

The interrogator device is portable and has multiple functional capabilities. This interrogator comprise an regulated battery power source, a processor, a programmable ROM, an event storage RAM, a clock/calender subcircuit, an optional liquid crystal display (LCD) display, and an input/output interface port to communicate with the recorder device. Operationally, the interrogator transmits time/calender data to each recorder device for synchronizing the time/date of each recorder, reads all or a specified number of events in stored memory of each recorder, clears the memory of each recorder, and performs diagnostic checks of a recorder for proper operation. When the interrogator reads data from a recorder, if the interrogator's voltage level is greater than a particular recorder, the interrogator provides power to the recorder to insure retrieval of recorded data.

The recorder/interrogator devices are inexpensive to make and use. Both use off-the-shelf components and require AA dry cell batteries. The low cost of each recorder/interroqator device allows personnel to leave multiple recorder outdoors for months and incur minimal cost if loss occurs. Each devicer's housing is weatherproof with dimensions of 4×5×1¼ in. The connection interface of each recorder/interroqator device is an external CINCH connector. The event recorder is typically housed in an aluminum temperature and weatherproof housing. A weatherproof cap covers the interrogator interface port. Screw connectors are provided for the external trigger switching circuit(s) provided by a terminal strip. The interrogator housing is comparable to the recorder's that includes an RS-232 port for downloading stored data. User interaction is provided through the LCD display and the operator keyboard with enter and step keys.

The recorder's power management scheme extends battery life by sensing and transmitting electrical pulses through each external trigger switching circuit. The recorder's timing/control interface functionally: i) scans at second intervals each external trigger switching circuit and maintains a sleep mode to the recorder's processor when the trigger circuit is closed, and ii) maintains the processor in a sleep mode when there is a low voltage state for maintaining stored data.

DETAILED DESCRIPTION OF THE INVENTION

Figure 1A:
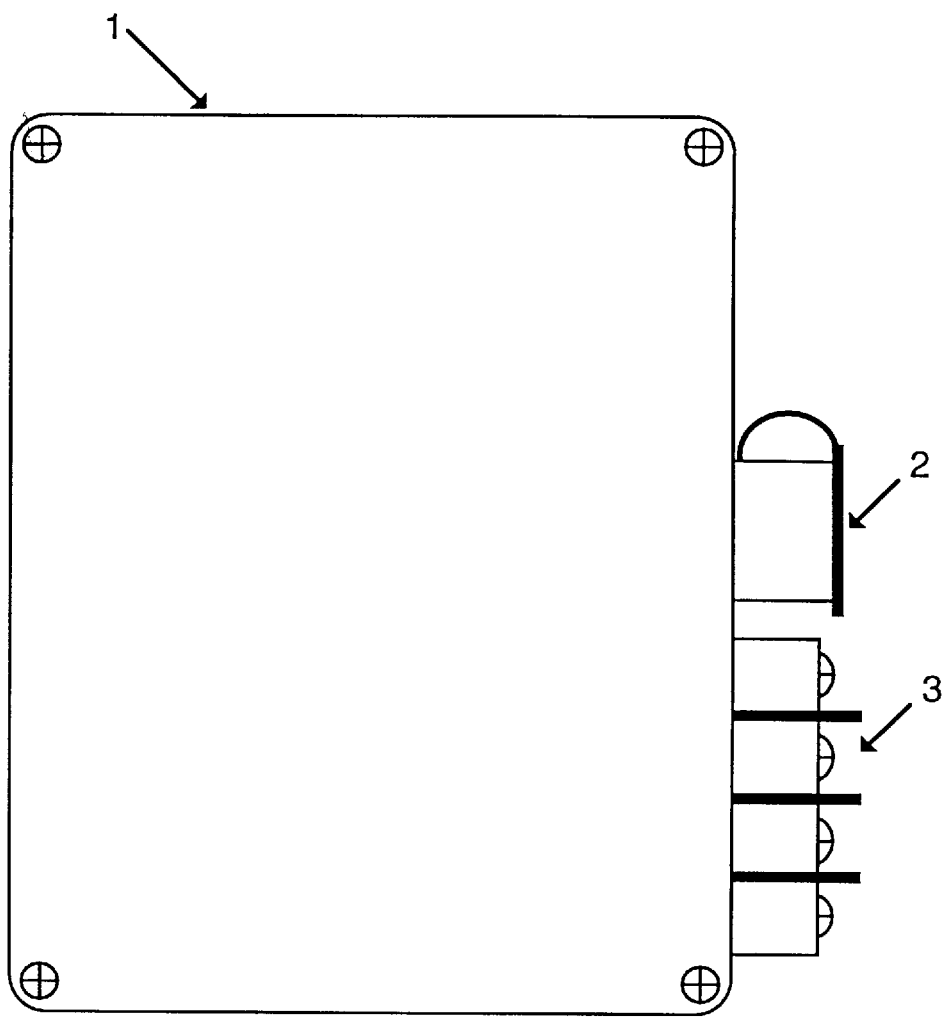
FIG. 1a and 1b show frontal views of the event recorder and interrogator devices respectively.
Figure 1B:
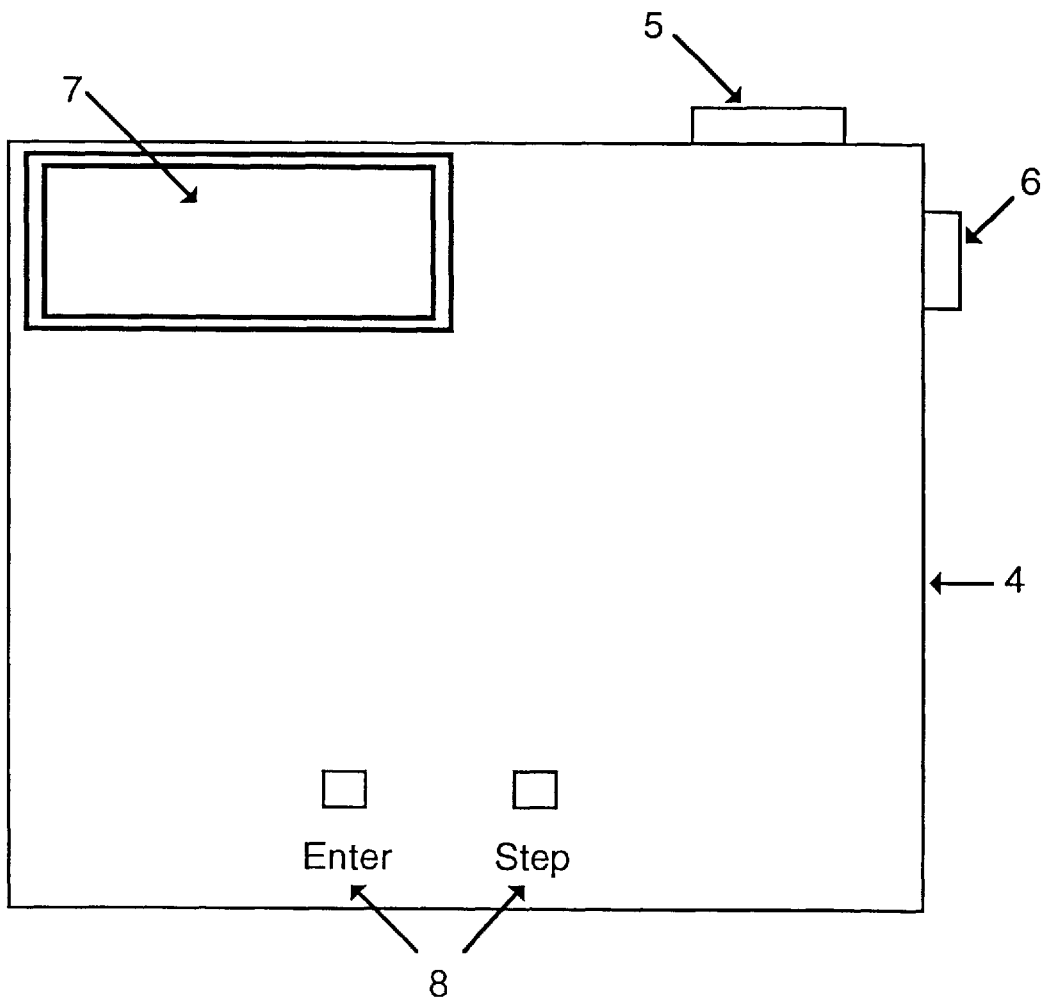

The data acquisition system's event recorder and interrogator are shown in FIGS. 1a & 1b respectively. The event recorder 1 records and stores the time and date of multiple events. An event is defined as the opening of a normally closed electrical switch to a high impedance state. The switch is an electrical circuit component carrying negligible voltage with some form of switching sensory component acting as a switch in the circuit. The switch is normally in the closed position providing a complete circuit when connected to a source, e.g. a simple wire attached to a high impedance source. This switching element is the external trigger circuit 30 as discussed below.

The recorder is in a weatherproof housings made of cast aluminum with removable top sealed cover that is secured to the main housing by screws. The interrogator interface port 2 also has an integral weatherproof cap. The external trigger circuit connection 3 is provided by a terminal strip which is also weather isolated from the internal circuitry of the recorder 1. The circuit boards for the processor and other components is housed within the housing. The housing of the interrogator 4 need not be weatherproof but is recommended for field use where the housing is made of s aluminum and has similar weatherproof caps for the RS232 serial port 5 and the recorder interface port 6. The LCD display 7 and operator keyboard 8 are sealed to keep out water.

Figure 2:
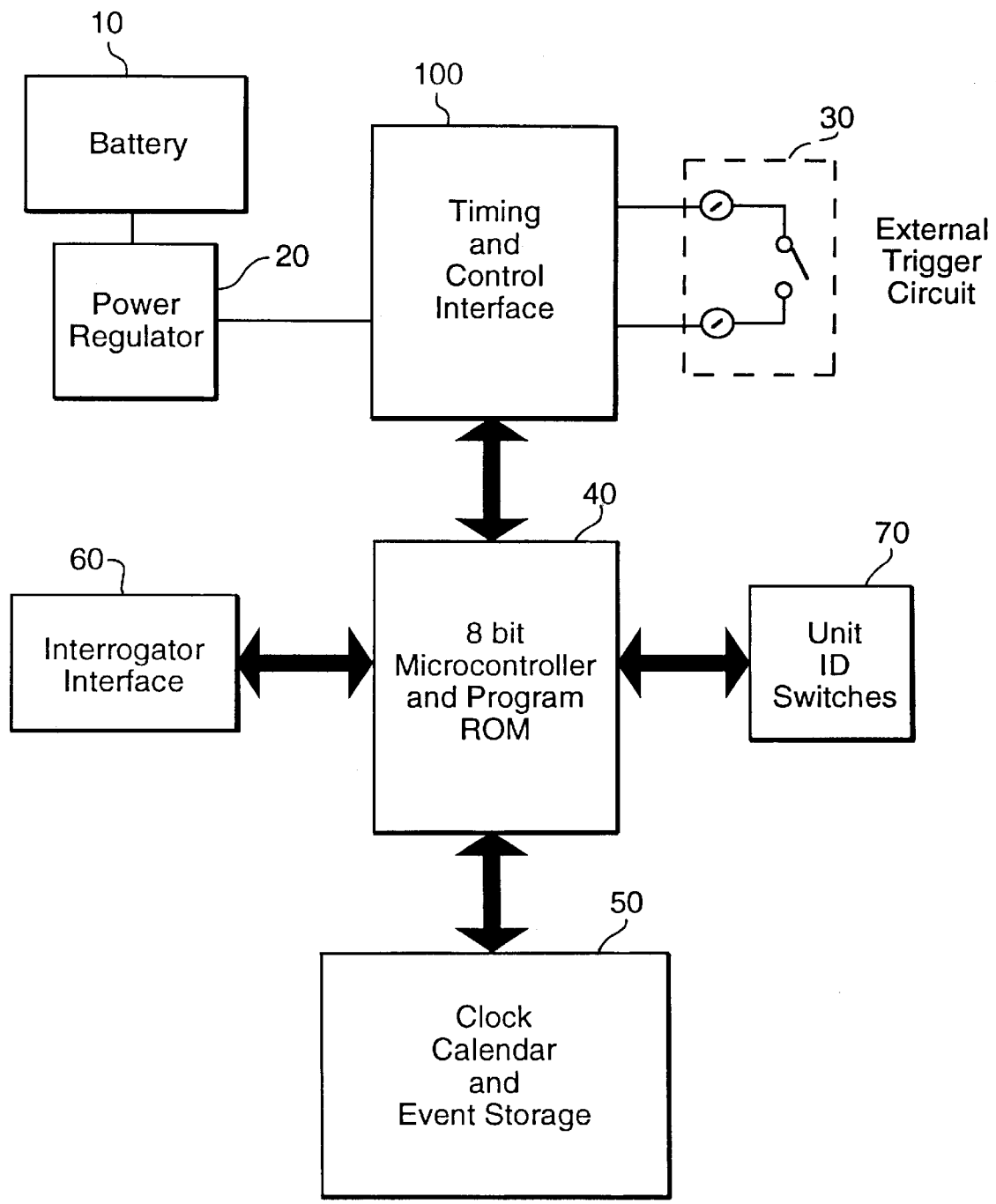
FIG. 2 shows a block diagram for the recorder's hardware design with heavy arrows indicating $I^2$ C data transmissions between the major subcomponents.

FIGS. 2 shows a block diagrams with $I^2$ C bus connections of the event recorder 1. Battery power source 10 is typically four AA size 1.5 VDC dry cell batteries for an unregulated power supply of 6 VDC. A power regulation component 20 takes the unregulated power from the battery source 10 that produces a constant 5 VDC for powering the recorder. A regulated 5 volt DC—DC converter IC such as a Maxim MAX777CPA can be used. The operation of the recorder is managed by a processor 40 such as Phillips Signet 87C751-2F24 8-bit CMOS controller which also stores the recorder's program in ROM. When battery power is present and an external dry switch circuit 30 is connected to the event recorder, the processor 40 directs the recorder to enter a sleep mode. In this state, a timing and control interface 100 samples the integrity of the external trigger circuit 30 every second by interface 100 transmitting a steep-fronted voltage step to external trigger circuit 30 from one end. The timing and control interface 100 continues transmission until the steep-fronted voltage step is detected at the other node of the external trigger circuit 30. Even for long electrical circuit leads, the time necessary between sending and receiving the steep-fronted voltage step is only a few hundred nanoseconds or less. If the timing and control interface 100 detects the steep-fronted voltage step on the return end of the external trigger circuit 30, the processor 40 remains in the idle state and the timing and control interface 100 resets itself to send another steep-fronted voltage step at the beginning of the next full second time interval. If the timing and control interface 100 does not detect the return of the steep-fronted voltage step before the end of the full second time interval, it does not reset itself and the processor wakes up to an active mode. The processor then reads the device ID number from an ID dip-switch 70 in the recorder and the time and date from the clock/calendar device 50. The microcontroller 40 then stores the event information as device ID, month, day, year, hour, and minute in the RAM storage of the clock/calendar device 50, e.g. a Philips PCF8583P IC. The processor 40 then enters a sleep mode. The processor 40 will remain in the sleep mode with negligible power requirements until the external trigger circuit 30 is reclosed, e.g. reclosure of a switch causing the timing and control interface 100 to reset to send another steep-fronted voltage step at the next full second time interval and the processor 40 is put into the sleep mode. Multiple events are stored in serial order in the RAM storage of the clock/calendar device 50 until the RAM storage limit is reached. The storage of additional events results in the loss of the earliest events where only the most recent events are retained. Event data is retrieved by the interrogator 4 through an interrogator interface 60. If the unregulated battery power falls to 3 VDC or less, the timing and control interface 100 causes processor 40 go into a sleep mode. In this state, the stored data is safe so long as battery power is maintained. The recorder's stored data can be cleared by removing the batteries from the unit or pressing an internal reset button. Audible diagnostics can be incorporated with the recorder device to determine operational status and a speak emit beeps when either batteries are installed, the reset button is activated, or when an event is detected. These audible digonostics include a number of beeps to signify different conditions, e.g. one beep meaning the device is operational, two beeps meaning a low battery condition exist and three beeps meaning a bad communications bus.

Figure 3:
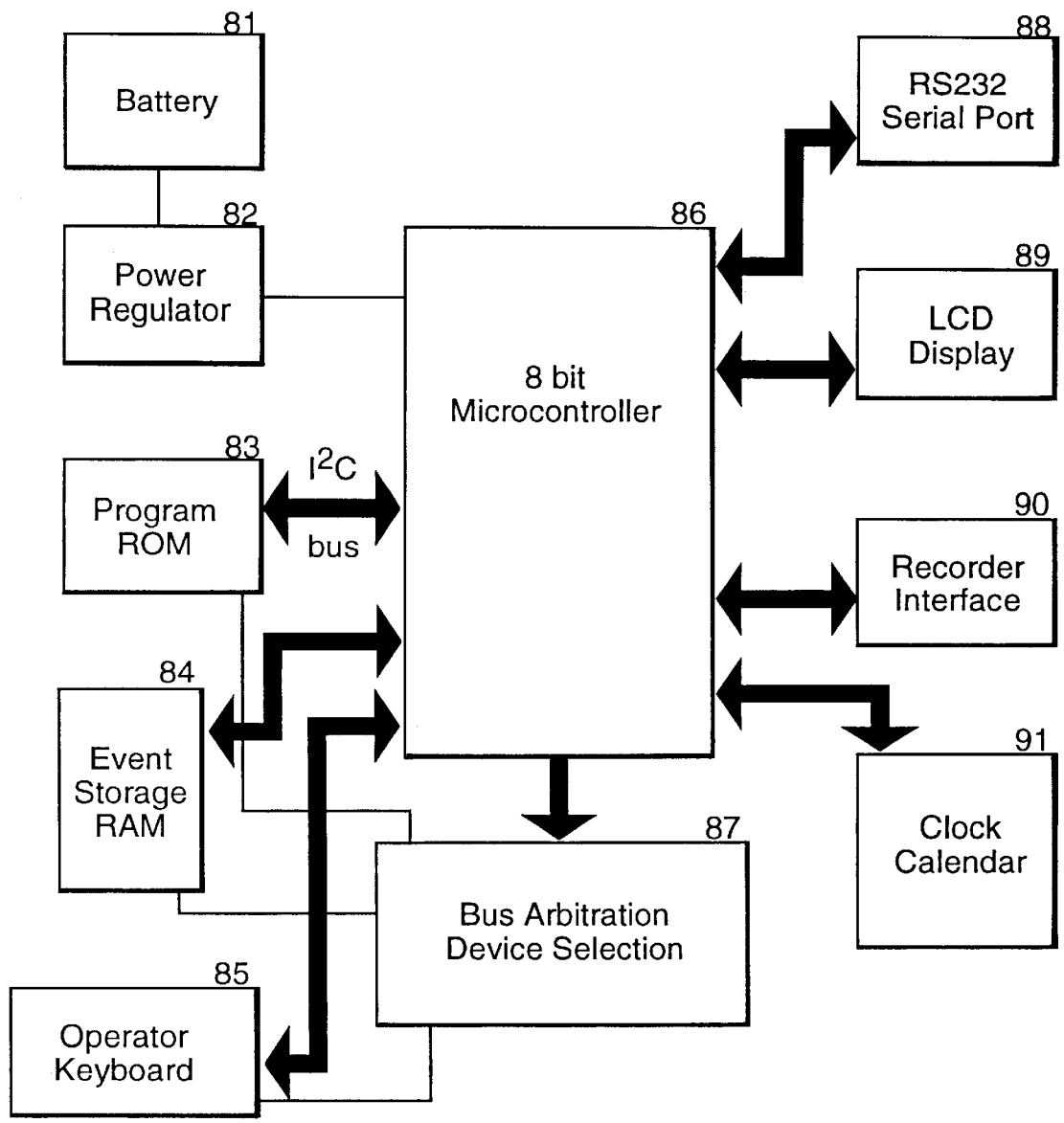
FIG. 3 shows a block diagram for the interroqator's hardware design with heavy arrows indicating $I^2$ C data transmissions between the major subcomponents.

FIG. 3 shows a block diagram of the interrogator 4. Similar to the recorder 1, power is supplied by four AA size 1.5 VDC dry cell batteries for an unregulated power source 81 of 6VDC. A power regulator 82 such as a Maxim MAX619CPA IC takes unregulated power and outputs a constant 5 VDC for the interrogator's power. The interrogator CPU operation is by an 8-bit processor 86 such as Phillips Signet 87C751 processor. The programing for the interrogator is stored in the program ROM 83 while the events retrieved from a recorder are stored in the event storage RAM 84. The interrogator allows storage of a predetermined number of events and if exceeded,any additional events are written over the earlier events. A clock/calendar component 91 such as Philips PCF8583 IC, is used for setting each recorder's time. A bus arbitration/device selection chip 87 directs the flow of information and commands along the $I_2$ C communications bus. An operator keypad 85 allows a user to control the interrogator operation with prompts, commands, and data visible on the LCD display 89. The interrogator can transmit data from RAM 84 to either a personal computer through an RS-232 serial port 88 or a recorder through an interface 90 as physically shown in FIG. 1b as 5 and 6 respectively. The interrogator programming as listed below with comments, can reset each recorder's clock 50, test a recorder's operation, read the recorder's stored events, and reset a recorder. The interrogator can be only two-buttons for a keyboard 85 as physically shown in FIG. 1b as keypad 8. The LCD display 89, as physically shown in FIG. 1b as displayed 7, shows prompts, commands or data in either the Interrogator or recorder and request input information from a user. The display 89 at turn-on shows the option of erasure of all the events in the event storage memory 84 with confirmation, the number of empty storage registers without stored events that can be stored without data loss, the interroqator's battery power level, and then the time and date with option to a user whether modification of the month, day, year, hour, or minute is required. When the time and date are accented, the interrogator performs a test of the $I^2C$ communications bus and also detects whether an event recorder is connected to the interrogator. If an event recorder is connected, the interrogator displays the recorder time and date and offers a user the option of reprogramming the recorder time and date to that of the interrogator. The interrogator then allows a user to retrieve all the events in the recorder or only the last 4 events. The display shows the total number of events held in the recorder. The interrogator then allows a user to step through all the events stored in its event storage memory. The display shows an event number i.e., #1 through #199, the recorder ID code number, the date, and the time of that event. After 30 seconds of inactivity by a user, the interrogator turns itself off to conserve power. When a recorder is connected to the interrogator, no additional events can be recorded. When the recorder's power is lower than the interrogator, the interrogator supplies Dower to the recorder.

Figure 4:
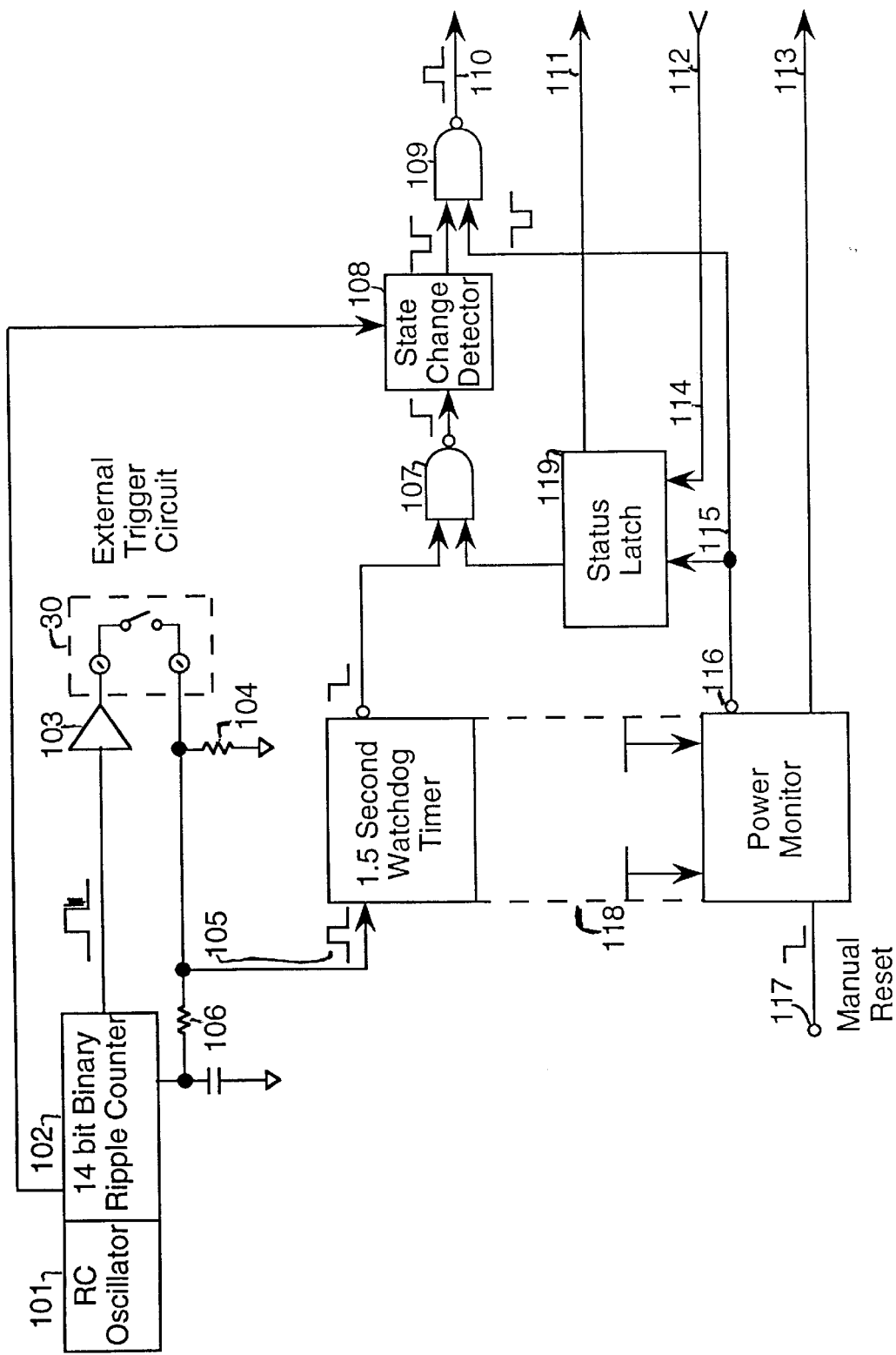
FIG. 4 shows a detailed description of the timing control subcircuit interface for power management of the recorder.

FIG. 4 shows a recorder's timing and control interface 100 in detail. The operation of this interface 100 includes a free running RC oscillator 101 operating at 1 hertz which initiates a steep fronted pulse of 5 VDC resetting a 14 bit binary ripple counter 102. These components are incorporated in a Motorola IC MC14060BP. The pulse passes through a current buffer 103 and then through the external trigger circuit 30. A low impedance termination 104 prevents false tripping caused by radio frequency noise. The pulse passes through a low pass RC network with a threshold voltage equal to one-half the pulse voltage before returning to reset counter 106. The trigger circuit lead length determines pulse width duration, i.e.the return travel time to the ripple counter 102 for optimal battery power conservation. If the external trigger circuit 30 is in a normally closed state, the binary ripple counter 102 resets itself, awaiting the next cycle of operation from the oscillator 101. A pulse 105 passes to the watchdog timer/power monitor 118, e.g. a Maxim IC MAX706CPA chip, and sets the output to a high state. Normally,, the status latch 119 is in a low state and the state change detector 108 detects no change. If the external trigger circuit 30 opens, a pulse is not sensed by the binary ripple counter 102 which in turn does not reset and the pulse 105 is not sensed by the watchdog timer/ power circuit 118. The watchdog timer 118 transmits a low power state output signal if another pulse is not sensed within 1.5 seconds. The NAND gate 107 switches this signal and the low state from the status latch 119 to a high state detected by the state change detector 108. The state change detector 108 provides an event and power wakeup pulse 110 to the processor 40. The Processor 40 can also becomes active when a manual reset switch 117 has been activated or when power goes below 3 VDC. Both of these events 116 set the status latch 119 and transmit a pulse signal to a NAND gate 109, which in turn transmits a wakeup pulse 110 to the processor 40. In the event of a low battery reset, the low battery threshold flag 113 is set to provide the processor 40 information on which diagnostic signal to display. If a power reset or event occurs, the status latch 119 sets and provides an event or Dower reset flag 111 to the processor 40 designating the proper diagnostic status. The processor 40 then reads the time and date and stores in the event RAM 84 and sends an interrupt clear 112 to reset the status latch 114.

In general, the recorder 1 can store in memory the times and dates of any event that can be triggered by interruption of the external trigger circuit 30, whether electrical, mechanical, or optical. In a preferred mode, many recorder units are Placed in a remote area along an ice-covered river with wires embedded in the ice acting as external trigger circuit 30 elements as taught in U.S. Pat. 5,446,448 by Zufelt et al. entitled "River Ice Motion Detector," which is incorporated by reference. When an ice cover begins a breakup event, the external trigger circuit(s) 30 break causing an event whose time and date are recorded by the recorder (s). By analyzing these times and dates of river ice breakup, predictions of such future occurrences can be made to provide advanced warning systems for communities downstream. The invention can also be used for security purposes, e.g. monitoring the opening of a door equipped with a magnetic switch or infrared sensor that act as the can also be used circuit 30. The invention can also be used for general process monitoring. Temperature-sensitive switches can be used to monitor the times and dates when machinery reaches unsafe operating temperatures. A limit sensory external trigger circuit 30 can also be used to monitor the time and date when traveling machinery reaches the ends of its intended operating range. Relay type switches could also be used as the trigger switching circuit to monitor the time and date of power outages or reductions to electrical equipment.

While this invention has been described in terms of a specific preferred embodiment, it is understood that it is capable of further modification and adaptation of the invention following in general the principle of the invention and including such departures from the present disclosure as come within the known or customary practice in the arts to which the invention pertains and may be applied to the central features set forth, and fall within the scope of the invention and of the limits of the appended claims. The assembly language programming of the interrogator and event recorder devices are as follows:

INTEROGATOR PROGRAM AND SUBROUTINE LISTINGS
```
$PAGINATE
$TITLE (INTMAIN - MAIN CODE FOR INTERROGATOR)
$VERSION (1.00)
$DATE (09/04/9x)
$PL=60
$PAGEWIDTH=120
$MN (INTMAIN)
$ALLPUBLIC
     EXTRNDISPLAZ(CODE),DISPHEX(CODE),B162ASC(CODE),GETCHAR(CODE)
     EXTRNDSP_MON(CODE),DSP_DAY(CODE),DSP_YR(CODE),GETEVNT(CODE)
     EXTRNDSP_HR(CODE),DSP_MIN(CODE),DISPTIM(CODE),PUTEVNT(CODE)
     EXTRNRECVI2C(CODE),XMITI2C(CODE),READCLK(CODE),WRITCLK(CODE)
     EXTRN
KEYWAIT(CODE),GETCHAR(CODE),TIMWAIT(CODE),DSPEVNT(CODE)
     EXTRNRDYMSG1(CODE)
     EXTRNMSG1A(CODE),MSG1B(CODE),MSG1C(CODE)
     EXTRNMSG2A(CODE),MSG2B(CODE),MSG2C(CODE)
     EXTRNMSG2D(CODE),MSG2E(CODE),MSG2F(CODE)
     EXTRNMSG3A(CODE),MSG3B(CODE)
     EXTRNMSG4A(CODE),MSG4B(CODE),MSG4C(CODE),MSG4D(CODE)
     EXTRNMSG5A(CODE),MSG5B(CODE),MSG5C(CODE),MSG5D(CODE)
     EXTRNMSG6A(CODE),MSG6B(CODE)
     EXTRNMSG7A(CODE),MSG7B(CODE)
     EXTRNVERSION(NUMBER)
       %INCLUDE "INTXTRN.ASM"
     DEFSEG     MAINSYS
     SEG   MAINSYS
     USING 0
;*******************************************************************
THIS CODE PROCESSES ALL OF THE MENU OPTIONS.
*******************************************************************
DAYSTAB:DB 00H,31H,29H,31H,30H,31H,30H,31H,31H,30H
     DB    00H,00H,00H,00H,00H,00H,31H,30H,31H  ;DAYS IN MONTH
MAINLIN:MOV    DIS_ROW,#0
     MOV   DIS_COL,#0
     MOV   DPTR,#RDYMSG1
                                    11.
```

Case No. COE-440

```
        LCALL DISPLAZ
        MOV   D_PROD+2,#LOW(VERSION)
        MOV   D_PROD+3,#HIGH(VERSION)
        MOV   DIS_ROW,#1
        MOV   DIS_COL,#13
        MOV   D_DIGIT,#4
        MOV   D_DECML,#2
        LCALL B162ASC ;DISPLAY VERSION
        DELAY 3,0
        LCALL TIMWAIT
MAINLP:
;****************************************
;****** ERASE LOCAL EVENT BUFFER ******
;****************************************
MENU7A: MOV   DIS_ROW,#0
        MOV   DIS_COL,#0
        MOV   DPTR,#MSG7A
        LCALL DISPLAZ
MENU7A1:LCALL KEYWAIT ;WAIT FOR NEXT KEY IN IDLE MODE
        CJNE  A,#K_STEP,MENU7A2
        SJMP  MENU7B
MENU7A2:CJNE  A,#K_ENTER,MENU7A1 ;GET NEW KEY
        SJMP  MENU7BX
;****************************************
;****** CONFIRM ERASE OPERATION ******
;****************************************
MENU7B: MOV   DIS_ROW,#0
        MOV   DIS_COL,#0
        MOV   DPTR,#MSG7B
        LCALL DISPLAZ
MENU7B1:LCALL KEYWAIT ;WAIT FOR NEXT KEY IN IDLE MODE
        CJNE  A,#K_STEP,MENU7B2
        CLR   A
        MOV   DPTR,#X_STORED
        MOVX  @DPTR,A
        INC   DPTR
        MOVX  @DPTR,A
        MOV   DPTR,#X_VIEW
        MOVX  @DPTR,A
        INC   DPTR
        MOVX  @DPTR,A
        SJMP  MENU7BX
MENU7B2:CJNE  A,#K_ENTER,MENU7B1   ;GET NEW KEY
MENU7BX:
;****************************************
;****** DISPLAY EMPTY BUFFERS ******
;****************************************
MENU1:  MOV   DIS_ROW,#0
        MOV   DIS_COL,#0
        MOV   DPTR,#MSG1C
        LCALL DISPLAZ
        CLR   C
        MOV   DPTR,#X_STORED+0
        MOVX  A,@DPTR
        MOV   B,A
        MOV   A,#LOW(NUMEVNT)
```

12.

Case No. COE-440

```
        SUBB    A,B
        MOV     D_PROD+2,A
        INC     DPTR
        MOVX    A,@DPTR
        MOV     B,A
        MOV     A,#HIGH(NUMEVNT)
        SUBB    A,B
        MOV     D_PROD+3,A
        MOV     DIS_ROW,#0
        MOV     DIS_COL,#2
        MOV     D_DIGIT,#3
        MOV     D_DECML,#0
        LCALL B162ASC ;DISPLAY NUMBER OF EVENTS REMAINING
;****************************************
;****** DISPLAY BATTERY LEVEL ******
;****************************************
        MOV     DIS_ROW,#1
        MOV     DIS_COL,#0
        JB      LASTIN.0+K_BATTLOW,MAINLP1
        MOV     DPTR,#MSG1A
        SJMP    MAINLP2
MAINLP1:MOV     DPTR,#MSG1B
MAINLP2:LCALL   DISPLAZ
MAINWT:LCALL    KEYWAIT ;WAIT FOR NEXT KEY IN IDLE MODE
        CJNE    A,#K_ENTER,MAINWT ;WAIT FOR ENTER KEY
;****************************************
;****** DISPLAY/SET LOCAL TIME ******
;****************************************
MENU2A: MOV     DIS_ROW,#0
        MOV     DIS_COL,#0
        MOV     DPTR,#MSG2A
        LCALL DISPLAZ
        MOV     D_I2CSA,#IID8583 ;SLAVE ADDRESS OF PCF8583 RAM
        LCALL READCLK ;RETRIEVE TIME

LCALL DISPTIM;AND DISPLAY IT

MENU2A1:LCALL KEYWAIT;WAIT FOR NEXT KEY IN IDLE MODE
        CJNE    A,#K_STEP,MENU2A2
        SJMP    MENU2B ;MODIFY MONTH
MENU2A2:CJNE A,#K_ENTER,MENU2A1 ;GET NEW KEY
        LJMP    MENU3
;****************************
;****** MODIFY MONTH ******
;****************************
MENU2B: MOV     DIS_ROW,#0
        MOV     DIS_COL,#0
        MOV     DPTR,#MSG2B
        LCALL DISPLAZ
MENU2B1:MOV     DIS_ROW,#1
        LCALL DSP_MON ;DISPLAY CURRENT MONTH
MENU2B2:LCALL   KEYWAIT ;WAIT FOR NEXT KEY IN IDLE MODE
        CJNE    A,#K_STEP,MENU2B9
        MOV     A,MONTH
        ADD     A,#1
        DA      A
```

13.

Case No. COE-440

```
            MOV    MONTH,A
            ADD    A,#LOW(-13H)
            JNC    MENU2B3
            MOV    MONTH,#1
MENU2B3:SJMP      MENU2B1 ;UPDATE DISPLAY
MENU2B9:CJNE      A,#K_ENTER,MENU2B2   ;GET NEW KEY
;*************************
;****** MODIFY DATE ******
;*************************
MENU2C:     MOV    DIS_ROW,#0
            MOV    DIS_COL,#7
            MOV    DPTR,#MSG2C
            LCALL DISPLAZ
MENU2C1:MOV        DIS_ROW,#1
            LCALL DSP_DAY;DISPLAY CURRENT DAY
MENU2C2:LCALL     KEYWAIT;WAIT FOR NEXT KEY IN IDLE MODE
            CJNE   A,#K_STEP,MENU2C9
            MOV    A,DATE
            ADD    A,#1
            DA     A
            MOV    DATE,A
            MOV    A,MONTH
            MOV    DPTR,#DAYSTAB
            MOVC   A,@A+DPTR
            CLR    C
            SUBB   A,DATE
            JNC    MENU2C3
            MOV    DATE,#1
MENU2C3:SJMP MENU2C1 ;UPDATE DISPLAY
MENU2C9:CJNE A,#K_ENTER,MENU2C2;GET NEW KEY
;*************************
;****** MODIFY YEAR ******
;*************************
MENU2D:     MOV    DIS_ROW,#0
            MOV    DIS_COL,#7
            MOV    DPTR,#MSG2D
            LCALL DISPLAZ
MENU2D1:MOV DIS_ROW,#1
            LCALL DSP_YR ;DISPLAY CURRENT YEAR
MENU2D2:LCALL     KEYWAIT;WAIT FOR NEXT KEY IN IDLE MODE
            CJNE   A,#K_STEP,MENU2D9
            MOV    A,YEAR
            ADD    A,#1
            DA     A
            MOV    YEAR,A
MENU2D3:SJMP      MENU2D1;UPDATE DISPLAY
MENU2D9:CJNE      A,#K_ENTER,MENU2D2   ;GET NEW KEY
;*************************
;****** MODIFY HOUR ******
;*************************
MENU2E:     MOV    DIS_ROW,#0
            MOV    DIS_COL,#7
            MOV    DPTR,#MSG2E
            LCALL DISPLAZ
MENU2E1:MOV DIS_ROW,#1 LCALL DSP_HR ;DISPLAY CURRENT HOUR
MENU2E2:LCALL     KEYWAIT ;WAIT FOR NEXT KEY IN IDLE MODE
                                    14.
```

Case No. COE-440

```
        CJNE    A,#K_STEP,MENU2E9
        MOV     A,HOUR
        ADD     A,#1
        DA      A
        MOV     HOUR,A
        ADD     A,#LOW(-24H)
        JNC     MENU2E3
        MOV     HOUR,#0
MENU2E3:SJMP    MENU2E1                 ;UPDATE DISPLAY
MENU2E9:CJNE    A,#K_ENTER,MENU2E2      ;GET NEW KEY
;****************************
;****** MODIFY MINUTE ******
;****************************
MENU2F: MOV DIS_ROW,#0
        MOV     DIS_COL,#7
        MOV     DPTR,#MSG2F
        LCALL DISPLAZ
MENU2F1:MOV     DIS_ROW,#1
        LCALL DSP_MIN           ;DISPLAY CURRENT MINUTE
MENU2F2:LCALL   KEYWAIT ;WAIT FOR NEXT KEY IN IDLE MODE
        CJNE    A,#K_STEP,MENU2F9
        MOV     A,MIN
        ADD     A,#1
        DA      A
        MOV     MIN,A
        ADD     A,#LOW(-60H)
        JNC     MENU2F3
        MOV     MIN,#0
MENU2F3:SJMP    MENU2F1 ;UPDATE DISPLAY
MENU2F9:CJNE    A,#K_ENTER,MENU2F2      ;GET NEW KEY
        MOV     D_I2CSA,#IID8583        ;SLAVE ADDRESS OF PCF8583 RAM
        LCALL WRITCLK                   ;WRITE TIME
;****************************
;****** TEST I2C BUS ******
;****************************
MENU3:      DELAY 1,0
        MOV     DIS_ROW,#0
        MOV     DIS_COL,#0
        MOV     DPTR,#MSG3A ;ASSUME NO RECORDER DETECTED
        JNB     LASTIN.0+K_RECRDR,MENU35;NO RECORDER DETECTED
        MOV     D_I2CSA,#RID8583        ;SLAVE ADDRESS OF PCF8583 RAM
        MOV     D_I2CWA,#A_VERSION      ;WORD ADDRESS OF 8583
        MOV     D_I2CCT,#0  ;NUMBER OF BYTES TO TRANSFER
        LCALL XMITI2C
        JB      B_I2CERR,MENU35 ;NO RECORDER DETECTED
        MOV     R0,#D_I2CBF             ;BUFFER TO READ BASE VERSION
        MOV     D_I2CCT,#S_VERSION      ;NUMBER OF BYTES TO TRANSFER
        LCALL RECVI2C                   ;READ VERSION
        JB      B_I2CERR,MENU35         ;NO RECORDER DETECTED
        MOV     DPTR,#MSG3B             ;FOUND THE RECORDER
MENU35:     LCALL DISPLAZ
MENU36:     ORL     PCON,#1
        CLR     EA
        MOV     A,D_TIME1+0
        ORL     A,D_TIME1+1
        SETB    EA
```

15.

Case No. COE-440

```
        JZ    MENU3
        LCALL GETCHAR                  ;GET NEW KEY
        CJNE  A,#K_ENTER,MENU36        ;WAIT FOR ENTER KEY
;****************************
;****** DISPLAY/SET REMOTE TIME ******
;****************************
MENU4:  MOV   DIS_ROW,#0
        MOV   DIS_COL,#0
        MOV   DPTR,#MSG4A
        LCALL DISPLAZ
        MOV   D_I2CSA,#RID8583         ;SLAVE ADDRESS OF PCF8583 RAM
        LCALL READCLK                  ;RETRIEVE TIME
        JB    B_I2CERR,MENU45
        LCALL DISPTIM                  ;AND DISPLAY IT
MENU43: LCALL KEYWAIT                  ;WAIT FOR NEXT KEY IN IDLE MODE
        CJNE  A,#K_STEP,MENU49
        MOV   D_I2CSA,#IID8583         ;SLAVE ADDRESS OF PCF8583 RAM
        LCALL READCLK                  ;RETRIEVE TIME
        JB    B_I2CERR,MENU44
        MOV   D_I2CSA,#RID8583         ;SLAVE ADDRESS OF PCF8583 RAM
        LCALL WRITCLK                  ;WRITE TIME
        JB    B_I2CERR,MENU44
        MOV   DPTR,#MSG4B
        SJMP  MENU46
MENU44: MOV   DPTR,#MSG4C
        SJMP  MENU46
MENU45: MOV   DPTR,#MSG4D
MENU46: MOV   DIS_ROW,#1
        MOV   DIS_COL,#0
        LCALL DISPLAZ
        SJMP  MENU43                   ;GET NEW KEY
MENU49: CJNE  A,#K_ENTER,MENU43        ;GET NEW KEY
;****************************
;****** RETRIEVE EVENTS ******
;****************************
MENU5:  MOV   D_I2CSA,#RID8583 ;SLAVE ADDRESS OF PCF8583 RAM
        MOV   D_I2CWA,#A_START         ;WORD ADDRESS OF 8583
        MOV   D_I2CCT,#0               ;NUMBER OF BYTES TO TRANSFER
        LCALL XMITI2C=
        JB    B_I2CERR,MENU51
        MOV   R0,#D_START              ;BUFFER TO READ DATA INTO
        MOV   D_I2CCT,#S_START         ;NUMBER OF BYTES TO TRANSFER
        LCALL RECVI2C                  ;READ OFFSET OF EVENT BUFFER
        JB    B_I2CERR,MENU51
        MOV   D_I2CWA,#A_MAX           ;WORD ADDRESS OF 8583
        MOV   D_I2CCT,#0               ;NUMBER OF BYTES TO TRANSFER
        LCALL XMITI2C
        JB    B_I2CERR,MENU51
        MOV   R0,#D_MAX                ;BUFFER TO READ DATA INTO
        MOV   D_I2CCT,#S_MAX           ;NUMBER OF BYTES TO TRANSFER
        LCALL RECVI2C                  ;READ MAXIMUM # OF EVENTS
        JB    B_I2CERR,MENU51
        MOV   D_I2CWA,#A_COUNT         ;WORD ADDRESS OF 8583
        MOV   D_I2CCT,#0               ;NUMBER OF BYTES TO TRANSFER
        LCALL XMITI2C
        JB    B_I2CERR,MENU51
```

16.

Case No. COE-440

```
        MOV    R0,#D_COUNT          ;BUFFER TO READ DATA INTO
        MOV    D_I2CCT,#S_COUNT     ;NUMBER OF BYTES TO TRANSFER
        LCALL  RECVI2C              ;READ NUMBER OF EVENTS STORED IN BUFFER
        JB     B_I2CERR,MENU51
        MOV    D_I2CWA,#A_HEAD      ;WORD ADDRESS OF 8583
        MOV    D_I2CCT,#0           ;NUMBER OF BYTES TO TRANSFER
        LCALL  XMITI2C
        JB     B_I2CERR,MENU51
        MOV    R0,#D_HEAD           ;BUFFER TO READ DATA INTO
        MOV    D_I2CCT,#S_HEAD      ;NUMBER OF BYTES TO TRANSFER
        LCALL  RECVI2C              ;READ HEAD POINTER TO STORE NEXT EVENT
        JB     B_I2CERR,MENU51
        MOV    D_I2CWA,#A_TAIL      ;WORD ADDRESS OF 8583
        MOV    D_I2CCT,#0           ;NUMBER OF BYTES TO TRANSFER
        LCALL  XMITI2C
        JB     B_I2CERR,MENU51
        MOV    R0,#D_TAIL           ;BUFFER TO READ DATA INTO
        MOV    D_I2CCT,#S_TAIL      ;NUMBER OF BYTES TO TRANSFER
        LCALL  RECVI2C              ;READ TAIL POINTER OF FIRST EVENT STORED
        JNB    B_I2CERR,MENU52
MENU51: MOV    DIS_ROW,#0
        MOV    DIS_COL,#0
        MOV    DPTR,#MSG5C
        LCALL  DISPLAZ              ;DISPLAY ERROR MESSAGE
MENU51A:LCALL  KEYWAIT              ;WAIT FOR NEXT KEY IN IDLE MODE
        CJNE   A,#K_ENTER,MENU51A   ;GET NEW KEY
        LJMP   MENU5X               ;ABORT
MENU52: JNB    B_ALL,MENU53
        CLR    C                    ;CALCULATE # OF BUFFERS REMAINING
        MOV    DPTR,#X_STORED+0
        MOVX   A,@DPTR
        MOV    B,A
        MOV    A,#LOW(NUMEVNT)
        SUBB   A,B
        MOV    D_XFER,A
        INC    DPTR
        MOVX   A,@DPTR
        MOV    B,A
        MOV    A,#HIGH(NUMEVNT)
        SUBB   A,B
        MOV    R6,A
        CLR    C                    ;CHECK TO SEE IF ALL CAN BE STORED
        MOV    A,D_XFER
        SUBB   A,D_COUNT
        MOV    A,R6
        SUBB   A,#0
        JNC    MENU52A              ;YES - SO PREPARE FOR IT
        CLR    B_ALL                ;FORCE XFER TYPE
        SJMP   MENU53A              ;NO - SO ONLY GET A FEW
MENU52A:MOV    D_XFER,D_COUNT       ;INITIALIZE # OF EVENTS TO XFER
        SJMP   MENU54
MENU53: CLR    C                    ;CALCULATE # OF BUFFERS REMAINING
        MOV    DPTR,#X_STORED+0
        MOVX   A,@DPTR
        MOV    B,A
        MOV    A,#LOW(NUMEVNT)
```

17.

Case No. COE-440

```
        SUBB  A,B
        MOV   D_XFER,A
        INC   DPTR
        MOVX  A,@DPTR
        MOV   B,A
        MOV   A,#HIGH(NUMEVNT)
        SUBB  A,B
        MOV   R6,A
;******   SETUP TO XFER SMALLEST OF ******
;******     1) REMAINING BUFFERS    ******
;******     2) MAXFER               ******
;******     3) EVENTS IN RECORDER   ******
MENU53A:MOV   A,D_COUNT       ;FIND SMALLER OF #2 AND #3 ABOVE
        ADD   A,#LOW(-MAXFER)  ;#3 - #2
        JNC   MENU53B          ;JUMP IF #3 IS SMALLER
        MOV   R5,#MAXFER       ;PREPARE TO TEST #1 VS. #2
        SJMP  MENU53C
MENU53B:MOV R5,D_COUNT         ;PREPARE TO TEST #1 VS. #3
MENU53C:CLR   C                ;FIND SMALLEST OF #1 VS. (#2 OR #3)
        MOV   A,D_XFER
        SUBB  A,R5
        MOV   A,R6
        SUBB  A,#0
        JC    MENU54           ;JUMP IF #1 IS SMALLEST
        MOV   D_XFER,R5        ;INITIALIZE # OF EVENTS TO XFER
MENU54:  MOV   A,D_XFER
        JNZ   MENU54A
        MOV   DIS_ROW,#0       ;DISPLAY NONE MESSAGE
        MOV   DIS_COL,#0
        MOV   DPTR,#MSG5D
        LCALL DISPLAZ
        SJMP  MENU5X           ;ABORT
MENU54A:JB B_ALL,MENU54C
        MOV   DIS_ROW,#0       ;DISPLAY LAST MESSAGE
        MOV   DIS_COL,#0
        MOV   DPTR,#MSG5B
        LCALL DISPLAZ
        MOV   D_PROD+2,D_XFER
        MOV   D_PROD+3,#0
        MOV   DIS_ROW,#0
        MOV   DIS_COL,#14
        MOV   D_DIGIT,#1
        MOV   D_DECML,#0
        LCALL B162ASC          ;DISPLAY EVENTS TO BE XFERRED
        SJMP  MENU55
MENU54C:MOV   DIS_ROW,#0       ;DISPLAY ALL MESSAGE
        MOV   DIS_COL,#0
        MOV   DPTR,#MSG5A
        LCALL DISPLAZ
        MOV   D_PROD+2,D_XFER
        MOV   D_PROD+3,#0
        MOV   DIS_ROW,#0
        MOV   DIS_COL,#14
        MOV   D_DIGIT,#2
        MOV   D_DECML,#0
        LCALL B162ASC          ;DISPLAY EVENTS TO BE XFERRED
```

18.

Case No. COE-440

```
MENU55: LCALL  KEYWAIT;WAIT FOR NEXT KEY IN IDLE MODE
        CJNE A,#K_STEP,MENU56
        CPL  B_ALL              ;CHANGE XFER TYPE
        LJMP MENU52             ;MODIFY MONTH
MENU56: CJNE A,#K_ENTER,MENU55  ;GET NEW KEY
        DEC  D_MAX              ;HIGHEST BUFFER # AT RECORDER
MENU57: LCALL GETEVNT  ;XFER NEXT EVENT FROM RECORDER
        JB   B_I2CERR,MENU58    ;DON'T STORE GARBAGE
        LCALL PUTEVNT  ;AND STORE IT IN 8K x 8 STATIC RAM
MENU58: DJNZ D_XFER,MENU57      ;XFER NEXT BUFFER
MENU5X:
;****************************
;****** DISPLAY EVENT ******
;****************************
MENU6:  MOV  DIS_ROW,#0
        MOV  DIS_COL,#0
        MOV  DPTR,#X_STORED+0
        MOVX A,@DPTR
        MOV  B,A
        INC  DPTR
        MOVX A,@DPTR
        ORL  A,B
        JNZ  MENU62
        SETB B_EMPTY
        MOV  DPTR,#MSG6B
        LCALL DISPLAZ
        SJMP MENU64
MENU62: CLR B_EMPTY
        MOV  DPTR,#MSG6A
        LCALL DISPLAZ
MENU63: LCALL DSPEVNT ;DISPLAY EVENT
MENU64: LCALL KEYWAIT ;WAIT FOR NEXT KEY IN IDLE MODE
        CJNE A,#K_STEP,MENU69
        JB   B_EMPTY,MENU64
        MOV  DPTR,#X_VIEW+0
        MOVX A,@DPTR
        ADD  A,#1
        MOV  R3,A
        INC  DPTR
        MOVX A,@DPTR
        ADDC A,#0
        MOV  R4,A
        SETB C
        MOV  DPTR,#X_STORED+0
        MOVX A,@DPTR
        SUBB A,R3
        INC  DPTR
        MOVX A,@DPTR
        SUBB A,R4
        JNC  MENU65
        MOV  R3,#0
        MOV  R4,#0
MENU65: MOV DPTR,#X_VIEW+0
        MOV  A,R3
        MOVX @DPTR,A
        INC  DPTR
```

19.

Case No. COE-440

```
        MOVX  A,@DPTR
        MOV   A,R4
        MOVX  @DPTR,A
        SJMP  MENU63     ;UPDATE DISPLAY
MENU69: CJNE  A,#K_ENTER,MENU64 ;GET NEW KEY
        LJMP  MAINLP
        END
;****************************************************************
$PAGINATE
$TITLE (INTVARS  -  VARIABLES)
$VERSION (1.10)
$DATE (09/15/95)
$PL=60
$PAGEWIDTH=120
$MN (INTVARS)
$ALLPUBLIC
        DEFSEG  SYSBITS, CLASS=BIT, PHANTOM
        SEG     SYSBITS
B_I2CERR:  DS   1;1 => I2C FAILURE
B_I2CBSY:  DS   1;1 => I2C IS BUSY
B_TYPSTEP: DS   1;1 => FIRST STEP TYPAMATIC KEY
B_EMPTY:   DS   1;1 => INT. EVENT BUFFER IS EMPTY
B_ALL:     DS   1;1 => RETRIEVE ALL EVENTS
                ;0 => RETRIEVE LAST 4 EVENTS
        ORG     P1.4
LCD_RS:    DS   1;LCD REGISTER SELECT
LCD_RW:    DS   1;LCD READ/WRITE
LCD_E:     DS   1;LCD ENABLE
DONE:      DS   1;0 => ALLOW KEYS TO GENERATE RESET
        ORG     P3.2
CTS:       DS   1;  => CLEAR TO SEND
NOT_USED:  DS   1;NOT USED
I2C_CLK:   DS   1;I2C SERIAL PORT CLOCK
I2C_DTA:   DS   1;I2C SERIAL PORT DATA
        DEFSEG  SYSDATA, START=18H, CLASS=DATA, ABSOLUTE
        SEG     SYSDATA
DIS_ROW:   DS   1;DISPLAY ROW ADDRESS
DIS_COL:   DS   1;DISPLAY COLUMN ADDRESS
D_CTCBF:   DS   1;COUNT OF BYTES IN COMMAND BUFFER
D_HDCBF:   DS   1;NEXT COMMAND BUFFER BYTE ADDRESS TO TAKE FROM
D_TLCBF:   DS   1;NEXT COMMAND BUFFER BYTE ADDRESS TO STORE AT
D_I2CCT:   DS   1;# OF DATA BYTES TO TRANSFER ON I2C BUS
D_I2CSA:   DS   1;I2C SLAVE ADDRESS
D_I2CWA:   DS   1;I2C WORD ADDRESS
D_BITS:    DS   2;DUMMY FILL FOR BIT DATA
LASTIN:    DS   1;LAST INPUT VALUES
;******************* START OF ORDER SPECIFIC VARIABLES
********************
D_EVENT:
D_ID:DS     1;ID OF RECORDER FOR THIS EVENT
MONTH:     DS   1;    MONTH
DATE:      DS   1;    DATE
YEAR:      DS   1;    YEAR
HOUR:      DS   1;    HOUR
MIN:       DS   1;CURRENT MINUTE
SIZEVNT         EQU  6;# OF BYTES NEEDED TO STORE AN EVENT
```

20.

Case No. COE-440

```
;**********************
 END OF ORDER SPECIFIC VARIABLES *
;**********************
 EVENT RECORDER DATA
 **********************************
D_START:   DS    1;ADDR. OF FIRST EVENT OF STORAGE BUFFER
D_MAX:     DS    1;MAXIMUM # OF EVENTS IN STORAGE BUFFER
D_COUNT:   DS    1;# EVENTS STORED
D_HEAD:    DS    1;HEAD POINTER TO STORE NEXT EVENT AT
D_TAIL:    DS    1;TAIL POINTER TO OLDEST EVENT STORED
;**********************************
 INTERROGATOR DATA*****************
 **********************************
D_XFER:    DS    1;NUMBER OF EVENTS TO RETRIEVE
D_TIME1:   DS    2;1/100th SECOND TIMER
D_TIME2:   DS    2;TIMER FOR POWER SHUTDOWN
D_STEP:    DS    2;# OF CONSECUTIVE SAME STEP SWITCH STATES
D_ENTR:    DS    2;# OF CONSECUTIVE SAME ENTER SWITCH STATES
D_I2CBF:   DS    10;BUFFER FOR I2C DATA
D_PROD:    DS    8;MULTIPLICATION/DIVISION WORK AREA
D_DIGIT:   DS    1;NUMBER OF DIGITS TO CONVERT TO ASCII
D_DECML:   DS    1;NUMBER OF DIGITS BEFORE THE DECIMAL POINT
       DEFSEG    SYSTACK, CLASS=IDATA
       SEG  SYSTACK
STACK:     DS    16;LOAD SP WITH STACK-1 AT RESET
       DEFSEG    BUFF, START=04000H, CLASS=XDATA, ABSOLUTE
       SEG  BUFF
X_INPUT:   DS    1;KEYBOARD AND INPUT PORT
       ORG  08000H
X_CBUFF:DS 256;COMMAND BUFFER
EO_CBUF    EQU   $
NUMEVNT    EQU   999;NUMBER OF BUFFERS FOR EVENT STORAGE
EVENTS:    DS    SIZEVNT * (NUMEVNT+1);CIRCULAR BUFFER OF RETRIEVED
EVENT
X_STORED:  DS    2;NUMBER OF RETRIEVED EVENTS STORED
X_VIEW:    DS    2;NUMBER OF EVENT TO VIEW;11.0592 MHz VALUES
T0RLOAD    EQU   -9216+7;RELOAD VALUE FOR TIMER 0=100 HZ
T1RLOAD    EQU   -3;RELOAD VALUE FOR TIMER 1=9600 BAUD
TICKS      EQU   100
MAXSW      EQU   TICKS*6/100
MAXTYP1    EQU   TICKS*100/100
MAXTYP2    EQU   TICKS*20/100
PWRTIME    EQU   TICKS*30;# OF SECONDS OF INACTIVITY BEFORE OFF
K_ENTER    EQU   0;ENTER KEY
K_STEP     EQU   1;STEP KEY
K_SPARE1   EQU   2;SPARE KEY 1
K_SPARE2   EQU   3;SPARE KEY 2
K_BATTLOW  EQU   4;BATTERY LOW INPUT
K_DTR      EQU   5;DTR INPUT
K_RECRDR   EQU   6;RECORDER PRESENT INPUT
K_SPARE3   EQU   7;SPARE INPUT 3
K_DUMMY    EQU   8;USED TO EXIT GETCHAR WHEN
MAXFER     EQU   4;# OF EVENTS TO XFER IF NOT "GET ALL"
BANK0      EQU   0*8
BANK1      EQU   1*8
BANK2      EQU   2*8
```

21.

Case No. COE-440

```
RID8583     EQU   10100000B;RECORDER PCF8583 SLAVE ADDRESS
IID8583     EQU   10100010B;INTERROGATOR PCF8583 SLAVE ADDRESS
NULLADDR    EQU   0E000H;POWER DOWN ADDRESS WITH NO CHIP SELECTS
;***********************************************************
NONVOLATILE RAM LAYOUT FOR VERSION 1.00
*************************************************************
J           TEQ   008H
A_VERSION   EQU   J;SOFTWARE VERSION THAT CREATED DATA
S_VERSION   EQU   2;SIZE OF VERSION FIELD
J           TEQ   J+S_VERSION
A_START     EQU   J;FIRST ADDRESS OF EVENT DATA
S_START     EQU   1;SIZE OF FIRST ADDRESS OF EVENT FIELD
J           TEQ   J+S_START
A_MAX       EQU   J;MAXIMUM NUMBER OF BUFFERS
S_MAX       EQU   1;SIZE OF MAXIMUM NUMBER OF BUFFERS
J           TEQ   J+S_MAX
A_COUNT     EQU   J;NUMBER OF EVENTS STORED
S_COUNT     EQU   1;SIZE OF NUMBER OF EVENTS STORED FIELD
J           TEQ   J+S_COUNT
A_HEAD      EQU   J;HEAD POINTER TO NEXT ADDRESS TO STORE
S_HEAD      EQU   1;SIZE OF HEAD POINTER
J           TEQ   J+S_HEAD
A_TAIL            EQU J;TAIL POINTER TO FIRST EVENT STORED
S_TAIL            EQU 1;SIZE OF TAIL POINTER
J           TEQ   J+S_TAIL
A_BASEYR    EQU   J;ACTUAL YEAR TIME WAS SET (0-99)
S_BASEYR    EQU   1;SIZE OF BASE YEAR FIELD
J           TEQ   J+S_BASEYR
A_PROGYR    EQU   J;YEAR (0-3) PROGRAMMED INTO PCF8583
S_PROGYR    EQU   1;SIZE OF PROGRAMMED YEAR FIELD
J           TEQ   J+S_PROGYR
A_LATER     EQU   J;SAVED FOR LATER EXPANSION
S_LATER     EQU   8;SIZE OF LATER EXPANSION FIELD
J           TEQ   J+S_LATER
MAXEVNT     EQU   (256-J)/SIZEVNT ;MAXIMUM NUMBER OF EVENTS
A_EVENT     EQU   J;EVENT STORAGE
S_EVENT     EQU   SIZEVNT*MAXEVNT ;SIZE OF EVENT STORAGE
J           TEQ   J+S_EVENT
            END
*************************************************************
      EXTRN DONE(BIT),CTS(BIT),I2C_DTA(BIT),I2C_CLK(BIT)
      EXTRN B_I2CERR(BIT),B_I2CBSY(BIT),B_TYPSTEP(BIT),B_ALL(BIT)
      EXTRN B_EMPTY(BIT)
      EXTRN D_I2CCT(DATA),D_I2CSA(DATA),D_I2CWA(DATA),D_I2CBF(DATA)
      EXTRN MIN(DATA),HOUR(DATA),DATE(DATA),MONTH(DATA),YEAR(DATA)
      EXTRN D_EVENT(DATA),D_ID(DATA),D_START(DATA),D_BITS(DATA)
      EXTRN D_COUNT(DATA),D_HEAD(DATA),D_TAIL(DATA),D_MAX(DATA)
      EXTRN DIS_ROW(DATA),DIS_COL(DATA),LASTIN(DATA),D_XFER(DATA)
      EXTRN D_STEP(DATA),D_ENTR(DATA)
      EXTRN D_TIME1(DATA),D_TIME2(DATA)
      EXTRN D_CTCBF(DATA),D_HDCBF(DATA),D_TLCBF(DATA)
      EXTRN D_PROD(DATA),D_DIGIT(DATA),D_DECML(DATA)
      EXTRN STACK(IDATA)
      EXTRN EVENTS(XDATA),X_CBUFF(DATA),X_INPUT(XDATA)
      EXTRN X_STORED(DATA),X_VIEW(DATA)
      EXTRN BANK0(NUMBER),BANK1(NUMBER),BANK2(NUMBER)
                          22.
```

Case No. COE-440

```
      EXTRN A_VERSION(NUMBER),A_BASEYR(NUMBER),A_PROGYR(NUMBER)
      EXTRN S_VERSION(NUMBER),S_BASEYR(NUMBER),S_PROGYR(NUMBER)
      EXTRN A_EVENT(NUMBER),A_START(NUMBER),A_MAX(NUMBER)
      EXTRN S_EVENT(NUMBER),S_START(NUMBER),S_MAX(NUMBER)
      EXTRN A_COUNT(NUMBER),A_HEAD(NUMBER),A_TAIL(NUMBER)
      EXTRN S_COUNT(NUMBER),S_HEAD(NUMBER),S_TAIL(NUMBER)
      EXTRN
SIZEVNT(NUMBER),MAXEVNT(NUMBER),NUMEVNT(NUMBER),MAXFER(NUMBER)
      EXTRN RID8583(NUMBER),IID8583(NUMBER)
      EXTRN
T0RLOAD(NUMBER),T1RLOAD(NUMBER),TICKS(NUMBER),MAXSW(NUMBER)
      EXTRN
PWRTIME(NUMBER),MAXTYP1(NUMBER),MAXTYP2(NUMBER),EO_CBUF(NUMBER)
      EXTRN
K_ENTER(NUMBER),K_STEP(NUMBER),K_BATTLOW(NUMBER),K_DTR(NUMBER)
      EXTRN K_RECRDR(NUMBER),K_DUMMY(NUMBER)
      EXTRN NULLADDR(NUMBER)
;*****************************************************************
* THIS MACRO TESTS THE I2C ERROR FLAG.;*
;*****************************************************************
ERRTEST    %MACRO
$NOALLPUBLIC
      %LOCAL    ADDR
      JNB   B_I2CERR,ADDR
      AJMP  I2CERR
ADDR:
$ALLPUBLIC
      %ENDM
;*****************************************************************
* THIS MACRO LOAD A DELAY TIMER.                                 *
;*****************************************************************
DELAY %MACRO   SECONDS,HUNDREDTHS
TIMER  EQ    SECONDS * 100 + HUNDREDTHS
      CLR   ET0
      MOV   D_TIME1,#LOW(TIMER)
      MOV   D_TIME1+1,#HIGH(TIMER)
      SETB  ET0
      %ENDM
******************************************************************
$PAGINATE
$TITLE  (INTSUBS - SUBROUTINES FOR ALL MODELS)
$VERSION (1.00)
$DATE (09/04/95)
$PL=60
$PAGEWIDTH=120
$MN (INTSUBS)
$ALLPUBLIC
      EXTRN RECVI2C(CODE),XMITI2C(CODE),IDIV(CODE),DISPLAY(CODE)
      EXTRN DISPHEX(CODE),CLRSCRN(CODE),BCD2HEX(CODE)
        %INCLUDE "INTXTRN.ASM"
      DEFSEG   MAINSYS
      SEG      MAINSYS
;*****************************************************************
* THIS SUBROUTINE CHECKS AND EXECUTES TASKS.                     *
******************************************************************
GETCHAR PROC
```

23.

Case No. COE-440

```
        PUSH B
        PUSH DPH
        PUSH DPL
        PUSH PSW
        MOV  PSW,#BANK2
L_GCLP: MOV  A,D_CTCBF ;CHECK FOR DATA TO APPEAR IN BUFFER
        JNZ  L?GET_1   ;JUMP IF THERE IS SOME
DUMMY:  MOV  A,#K_DUMMY;RESPOND WITH FAKE KEYSTROKE
        LJMP L?GET_X
L?GET_1:MOV  DPH,#HIGH(X_CBUFF)
        MOV  DPL,D_HDCBF
        MOVX A,@DPTR;GET DATA AT HEAD
        MOV  R2,A;TEMPORARY STORAGE FOR ROUTINE
        CLR  A
        ;MOVX@DPTR,A;ZERO OUT VALUE
        INC  DPL
        MOVX A,@DPTR;GET DATA AT HEAD
        MOV  R0,A ;STORE PARAMETER TO PASS TO ROUTINE
        CLR  A
        ;MOVX@DPTR,A;ZERO OUT VALUE
        INC  DPL
        MOV  A,DPL
        MOV  D_HDCBF,A
        CJNE A,#LOW(EO_CBUF),L?GET_2;CHECK FOR BUFFER WRAP AROUND
        MOV  D_HDCBF,#LOW(X_CBUFF);LOAD HEAD
L?GET_2:DEC  D_CTCBF;SUBTRACT BYTE IN BUFFER
        MOV  A,R2
        ADD  A,#LOW(-Q_KEY-1)
        JC   L?RESET ;VALUE IS TOO LARGE SO RESET MPU
        MOV  A,#LOW(L_GCLP);FORCE RETURN ADDRESS ON STACK
        PUSH ACC
        MOV  A,#HIGH(L_GCLP)
        PUSH ACC
        MOV  A,R2
        RL   A
        ADD  A,R2
        MOV  DPTR,#TASKTAB
        JMP  @A+DPTR
L?RESET:NOP ;HELPS ICE TRAPPING
        MOV  SP,#STACK-1;INITIALIZE STACK POINTER TO MAKE
                        ;SURE THERE IS ROOM TO STORE
        CLR  A ;RESET VECTOR ON STACK
        PUSH ACC
        PUSH ACC
        RETI;CLEAR INT AND RETURN TO 0000H
TASKTAB:
Q_NULL EQU ($-TASKTAB)/3
        LJMP L?RESET;NO SUCH ROUTINE # SO RESET
Q_POWER EQU    ($-TASKTAB)/3
        LJMP POWERDN;INACTIVITY POWER DOWN
Q_KEYEQU   ($-TASKTAB)/3=
        POP  ACC;REMOVE RETURN ADDRESS
        POP  ACC;FROM STACK
        MOV  D_TIME2,#LOW(PWRTIME)     ;LOAD INACTIVITY TIMER
        MOV  D_TIME2+1,#HIGH(PWRTIME)
        MOV  A,R0 ;PUT KEY IN ACC
```

24.

Case No. COE-440

```
L?GET_X: POP     PSW
         POP     DPL
         POP     DPH
         POP     B
PROCNUL: RET
GETCHAR  ENDPROC
;****************************************************************
  THIS SUBROUTINE PUTS AN INSTRUCTION INTO THE COMMAND BUFFER.
;****************************************************************
CBUFIN   PROC
         PUSH IE
         CLR  EA
         MOV  DPH,#HIGH(X_CBUFF)
         MOV  DPL,D_TLCBF
         MOVX @DPTR,A;STORE ROUTINE AT TAIL
         INC  DPL
         MOV  A,R1
         MOVX @DPTR,A;STORE PARAMETER AT TAIL
         INC  DPL
         MOV  A,DPL
         MOV  D_TLCBF,A
         CJNE A,#LOW(EO_CBUF),CBUFI_1;CHECK FOR BUFFER WRAP AROUND
         MOV  D_TLCBF,#LOW(X_CBUFF);LOAD TAIL
CBUFI_1: INC  D_CTCBF;COUNT NEW COMMAND IN BUFFER
         POP  IE
         RET
CBUFIN   ENDPROC
;****************************************************************
  THIS SUBROUTINE WAITS IN IDLE MODE FOR TIMER 1 TO TIMEOUT.
;****************************************************************
TIMWAIT  PROC

L?LOOP:  LCALL GETCHAR
         ORL  PCON,#1
         PUSH IE
         CLR  EA
         MOV  A,D_TIME1+0
         ORL  A,D_TIME1+1
         POP  IE
         JNZ  L?LOOP
         RET
TIMWAIT  ENDPROC
;****************************************************************
  THIS SUBROUTINE WAITS IN IDLE MODE UNTIL A KEY IS PRESSED.
;****************************************************************
KEYWAIT  PROC
L?LOOP:  ORL  PCON,#1
         LCALL GETCHAR
         CJNE A,#K_DUMMY,L?EXIT
         SJMP L?LOOP
L?EXIT:  RET
KEYWAIT  ENDPROC
;****************************************************************
  THIS SUBROUTINE PUTS THE CPU IN POWER DOWN MODE AFTER INACTIVITY.
;****************************************************************
POWERDN  PROC
```

25.

Case No. COE-440

```
        LCALL CLRSCRN
        CLR   EA
        MOV   P3,#11111111B
        MOV   P2,#HIGH(NULLADDR)
        MOV   P1,#0 ;TURN OFF LCD POWER
;       SJMP  NOPOWER
;       ORG   0DEDH
NOPOWER:MOV   SCON,#0
        MOV   SBUF,#0FFH
        MOV   TCON,#0
        MOV   TL0,#0
        NOP
        NOP
        NOP
        NOP
        MOV   PCON,#0FFH     ;PUT CPU IN POWER DOWN MODE
        SJMP  $
        RET
POWERDN ENDPROC
;*************************************************************
THIS SUBROUTINE DISPLAYS THE TIME ON THE BOTTOM LINE OF THE LCD.
**************************************************************
DISPTIM PROC
        MOV   DIS_ROW,#1
        LCALL DSP_MON ;DISPLAY MONTH
        LCALL DSP_DAY ;DISPLAY DAY
        LCALL DSP_YR  ;DISPLAY YEAR
        LCALL DSP_HR  ;DISPLAY HOUR
        LCALL DSP_MIN ;DISPLAY MINUTE
        RET
DISPTIM ENDPROC
;*************************************************************
THIS SUBROUTINE DISPLAYS THE MONTH ON THE LCD.           *
**************************************************************
DSP_MON PROC
        MOV   DIS_COL,#0
        MOV   A,MONTH
        LCALL DISPHEX
        RET
DSP_MON ENDPROC
;*************************************************************
THIS SUBROUTINE DISPLAYS THE DAY ON THE LCD.             *
**************************************************************
DSP_DAY PROC
        MOV   DIS_COL,#3
        MOV   A,DATE
        LCALL DISPHEX
        RET
DSP_DAY ENDPROC
;*************************************************************
THIS SUBROUTINE DISPLAYS THE YEAR ON THE LCD.            *
**************************************************************
DSP_YR  PROC
        MOV   DIS_COL,#6
        MOV   A,YEAR
        LCALL DISPHEX
```

26.

Case No. COE-440

```
        RET
DSP_YR  ENDPROC

;****************************************************
; THIS SUBROUTINE DISPLAYS THE HOUR ON THE LCD.
;****************************************************
DSP_HR  PROC
        MOV   DIS_COL,#10
        MOV   A,HOUR
        LCALL DISPHEX
        RET
DSP_HR  ENDPROC
;****************************************************
; THIS SUBROUTINE DISPLAYS THE MINUTE ON THE LCD.
;****************************************************
DSP_MIN PROC
        MOV   DIS_COL,#13
        MOV   A,MIN
        LCALL DISPHEX
        RET
DSP_MIN ENDPROC

;**********************************************************
; THIS SUBROUTINE WRITES THE TIME OF DAY DATA INTO THE 8583.
;**********************************************************
WRITCLK PROC
        MOV   D_I2CBF+0,#10000000B ;CONTROL REGISTER
        MOV   D_I2CWA,#0
        MOV   R0,#D_I2CBF          ;ADDRESS OF DATA
        MOV   D_I2CCT,#1
        LCALL XMITI2C ; STOP COUNTING
        JB    B_I2CERR,L?ERROR
        MOV   D_I2CBF+1,#0;HUNDREDTHS
        MOV   D_I2CBF+2,#0;SECONDS
        MOV   D_I2CBF+3,MIN;MINUTES
        MOV   D_I2CBF+4,HOUR;HOURS
        MOV   A,YEAR
        MOV   D_I2CBF+7,A
        LCALL BCD2HEX
        ANL   A,#00000011B
        MOV   D_I2CBF+8,A
        MOV   B,DATE
        MOV   C,ACC.0
        MOV   B.6,C
        MOV   C,ACC.1
        MOV   B.7,C
        MOV   D_I2CBF+5,B;YEARS/DAYS
        MOV   D_I2CBF+6,MONTH;MONTHS
        MOV   D_I2CWA,#1
        MOV   R0,#D_I2CBF+1;ADDRESS OF DATA
        MOV   D_I2CCT,#6
        LCALL XMITI2C
        JB    B_I2CERR,L?ERROR
        MOV   D_I2CWA,#A_BASEYR
        MOV   R0,#D_I2CBF+7;ADDRESS OF DATA
        MOV   D_I2CCT,#S_BASEYR
```

27.

Case No. COE-440

```
        LCALL XMITI2C
        JB    B_I2CERR,L?ERROR
        MOV   D_I2CWA,#A_PROGYR
        MOV   R0,#D_I2CBF+8;ADDRESS OF DATA
        MOV   D_I2CCT,#S_PROGYR
        LCALL XMITI2C
L?ERROR:MOV   D_I2CBF,#00000000B;CONTROL REGISTER
        MOV   D_I2CWA,#0
        MOV   R0,#D_I2CBF;ADDRESS OF DATA
        MOV   D_I2CCT,#1
        LCALL XMITI2C;START COUNTING
L?EXIT: RET
WRITCLK ENDPROC
;*************************************************************
  THIS SUBROUTINE READS THE TIME OF DAY DATA FROM THE 8583.
;*************************************************************
READCLK PROC
        MOV   D_I2CBF,#01000000B
        MOV   D_I2CWA,#0 ;WORD ADDRESS OF 8583
        MOV   R0,#D_I2CBF;ADDRESS OF DATA
        MOV   D_I2CCT,#1 ;NUMBER OF BYTES TO TRANSFER
        LCALL XMITI2C;STORE/HOLD LAST COUNT
        JB    B_I2CERR,L?ERROR
        MOV   D_I2CWA,#2;WORD ADDRESS OF 8583
        MOV   D_I2CCT,#0;NUMBER OF BYTES TO TRANSFER
        LCALL XMITI2C
        JB    B_I2CERR,L?ERROR
        MOV   R0,#D_I2CBF;BUFFER TO READ DATA INTO
        MOV   D_I2CCT,#5;NUMBER OF BYTES TO TRANSFER
        LCALL RECVI2C;READ TIME AND DATE
        JB    B_I2CERR,L?ERROR
        MOV   D_I2CWA,#A_BASEYR;WORD ADDRESS OF 8583
        MOV   D_I2CCT,#0;NUMBER OF BYTES TO TRANSFER
        LCALL XMITI2C
        JB    B_I2CERR,L?ERROR
        MOV   R0,#D_I2CBF+5;BUFFER TO READ BASE YEAR DATA INTO
        MOV   D_I2CCT,#S_BASEYR;NUMBER OF BYTES TO TRANSFER
        LCALL RECVI2C;READ BASE YEAR
        JB    B_I2CERR,L?ERROR
        MOV   D_I2CWA,#A_PROGYR      ;WORD ADDRESS OF 8583
        MOV   D_I2CCT,#0;NUMBER OF BYTES TO TRANSFER
        LCALL XMITI2C
        JB    B_I2CERR,L?ERROR
        MOV   R0,#D_I2CBF+6;BUFFER TO READ BASE YEAR DATA INTO
        MOV   D_I2CCT,#S_PROGYR;NUMBER OF BYTES TO TRANSFER
        LCALL RECVI2C;READ PROGRAMMED YEAR
        JNB   B_I2CERR,L?OK
L?ERROR:AJMP  L?EXIT
L?OK:   MOV   A,D_I2CBF+1
        MOV   MIN,A
        MOV   A,D_I2CBF+2
        ANL   A,#00111111B
        MOV   HOUR,A
        MOV   A,D_I2CBF+3
        ANL   A,#00111111B
        MOV   DATE,A
```

28.

Case No. COE-440

```
            MOV    A,D_I2CBF+4
            ANL    A,#00011111B
            MOV    MONTH,A
            MOV    A,D_I2CBF+3
            RL     A
            RL     A
            ANL    A,#00000011B
            CLR    C
            SUBB   A,D_I2CBF+6
            JNC    L?FIXYR
            ADD    A,#4
L?FIXYR:    ADD    A,D_I2CBF+5
            DA     A
            MOV    YEAR,A
L?EXIT:     MOV    D_I2CBF+0,#0
            MOV    D_I2CWA,#0 ;WORD ADDRESS OF 8583
            MOV    R0,#D_I2CBF+0;ADDRESS OF DATA
            MOV    D_I2CCT,#1 ;NUMBER OF BYTES TO TRANSFER
            LCALL  XMITI2C;ENABLE COUNTING AGAIN
            RET
READCLK     ENDPROC
;****************************************************************
THIS SUBROUTINE CONVERTS THE 16 BIT NUMBER IN D_PROD+3,2 TO ASCII
AND DISPLAYS IT RIGHT JUSTIFIED ON THE LCD PADDED WITH SPACES.
;****************************************************************
B162ASC     PROC
            MOV    D_PROD+1,#0
            MOV    D_PROD+0,#10;LOAD DIVISOR
L?LOOP:     MOV    A,D_DECML
            JNB    ACC.7,L?NUM
            MOV    A,D_PROD+3
            ORL    A,D_PROD+2
            JNZ    L?NUM
            MOV    A,#' '
            SJMP   L?CHAR
L?NUM:      LCALL  IDIV
            MOV    A,D_PROD+4
            ADD    A,#'0'
L?CHAR:     PUSH   DIS_COL
            PUSH   DIS_ROW
            LCALL  DISPLAY
            POP    DIS_ROW
            POP    DIS_COL
            DEC    DIS_COL
            DJNZ   D_DECML,L?POINT
            MOV    A,#'.'
            PUSH   DIS_COL
            PUSH   DIS_ROW
            LCALL  DISPLAY
            POP    DIS_ROW
            POP    DIS_COL
            DEC    DIS_COL
L?POINT:    DJNZ   D_DIGIT,L?LOOP
L?EXIT:     RET
B162ASC     ENDPROC
```

Case No. COE-440

```
;***************************************************************
 THIS SUBROUTINE RETRIEVES THE NEXT EVENT FROM THE RECORDER.
;***************************************************************
GETEVNT   PROC
          MOV   D_I2CSA,#RID8583;SLAVE ADDRESS OF PCF8583 RAM
          DEC   D_HEAD
          MOV   A,D_HEAD
          CJNE  A,#LOW(-1),L_GET1;JUMP IF NO WRAP AROUND
          MOV   A,D_MAX;WRAP TO MAXIMUM VALUE
          MOV   D_HEAD,A
L_GET1:   MOV   B,#SIZEVNT
          MUL   AB
          ADD   A,D_START
          MOV   D_I2CWA,A;WORD ADDRESS OF 8583
          MOV   D_I2CCT,#0;NUMBER OF BYTES TO TRANSFER
          LCALL XMITI2C
          JB    B_I2CERR,L?ERROR
          MOV   R0,#D_EVENT          ;BUFFER TO READ DATA INTO
          MOV   D_I2CCT,#SIZEVNT     ;NUMBER OF BYTES TO TRANSFER
          LCALL RECVI2C              ;READ TIME AND DATE
L?ERROR:
L?EXIT:   RET
GETEVNT   ENDPROC
;***************************************************************
 THIS SUBROUTINE STORES THE EVENT IN THE NEXT AVAILABLE BUFFER.
;***************************************************************
PUTEVNT   PROC
          MOV   R7,#SIZEVNT;CONSTANT AND LOOP COUNTER
          MOV   DPTR,#X_STORED+0
          MOVX  A,@DPTR
          MOV   B,R7
          MUL   AB
          MOV   R5,A
          MOV   R6,B
          INC   DPTR
          MOVX  A,@DPTR
          MOV   B,R7
          MUL   AB
          ADD   A,R6
          MOV   DPL,A
          MOV   A,R5
          ADD   A,#LOW(EVENTS)
          XCH   A,DPL
          ADDC  A,#HIGH(EVENTS)
          MOV   DPH,A
          MOV   R0,#D_EVENT
L_PUT1:   MOV   A,@R0
          MOVX  @DPTR,A
          INC   R0
          INC   DPTR
          DJNZ  R7,L_PUT1
          MOV   DPTR,#X_STORED+0
          MOVX  A,@DPTR
          ADD   A,#1
          MOVX  @DPTR,A
          INC   DPTR
```

30.

Case No. COE-440

```
        MOVX A,@DPTR
        ADDC A,#0
        MOVX @DPTR,A
L?EXIT: RET
PUTEVNT ENDPROC
;****************************************************************
; THIS SUBROUTINE DISPLAYS THE EVENT ON THE LCD.                 *
;****************************************************************
DSPEVNT PROC
        MOV  R7,#SIZEVNT;CONSTANT AND LOOP COUNTER
        MOV  DPTR,#X_VIEW+0
        MOVX A,@DPTR
        MOV  B,R7
        MUL  AB
        MOV  R5,A
        MOV  R6,B
        INC  DPTR
        MOVX A,@DPTR
        MOV  B,R7
        MUL  AB
        ADD  A,R6
        MOV  DPL,A
        MOV  A,R5
        ADD  A,#LOW(EVENTS)
        XCH  A,DPL
        ADDC A,#HIGH(EVENTS)
        MOV  DPH,A
        MOV  R0,#D_EVENT
L_VIEW1:MOVX A,@DPTR
        MOV  @R0,A
        INC  R0
        INC  DPTR
        DJNZ R7,L_VIEW1
        MOV  DPTR,#X_VIEW+0
        MOVX A,@DPTR
        ADD  A,#1
        MOV  D_PROD+2,A
        INC  DPTR
        MOVX A,@DPTR
        ADDC A,#0
        MOV  D_PROD+3,A
        MOV  DIS_ROW,#0
        MOV  DIS_COL,#3
        MOV  D_DIGIT,#3
        MOV  D_DECML,#0
        LCALL B162ASC;DISPLAY RECORD NUMBER
        MOV  D_PROD+2,D_ID
        MOV  D_PROD+3,#0
        MOV  DIS_ROW,#0
        MOV  DIS_COL,#15
        MOV  D_DIGIT,#3
        MOV  D_DECML,#0
        LCALL B162ASC;DISPLAY ID
        LCALL DISPTIM
L?EXIT: RET
DSPEVNT ENDPROC
```

31.

Case No. COE-440

```
        END
****************************************************************
$PAGINATE
$TITLE (INTMSGS - MESSAGES FOR INTERROGATOR)
$VERSION (1.00)
$DATE (08/31/95)
$PL=60
$PAGEWIDTH=120
$MN (INTMSGS)
$ALLPUBLIC
        DEFSEG  MAINMSG, CLASS=CODE
        SEG  MAINMSG
VERSION    EQU  100
RDYMSG1:DB '  INTERROGATOR  '
        DB '     VERSION       ',0
MSG1A:  DB ' BATTERY IS GOOD',0
MSG1B:  DB ' BATTERY IS LOW ',0
MSG1C:  DB '    EVENTS EMPTY',0
MSG2A:  DB 'LOCAL DATE/TIME '
        DB '  /  /     :    ',0
MSG2B:  DB 'MODIFY MONTH    '
        DB '  /DD/YY  HH:MM ',0
MSG2C:  DB 'DAY   ',0
MSG2D:  DB 'YEAR  ',0
MSG2E:  DB 'HOUR  ',0
MSG2F:  DB 'MINUTE',0
MSG3A:  DB ' EVENT RECORDER '
        DB '   NOT DETECTED   ',0
MSG3B:  DB ' EVENT RECORDER '
        DB '    DETECTED    ',0
MSG4A:  DB 'REMOTE DATE/TIME'
        DB '  /  /     :    ',0
MSG4B:  DB 'WAS PROGRAMMED  ',0
MSG4C:  DB 'NOT PROGRAMMED  ',0
MSG4D:  DB 'REMOTE I2C ERROR',0
MSG5A:  DB 'RETRIEVE ALL    '
        DB 'EVENTS STORED   ',0
MSG5B:  DB 'RETRIEVE LAST   '
        DB 'EVENTS STORED   ',0
MSG5C:  DB 'TRANSMIT FAILURE'
        DB 'REMOTE I2C ERROR',0
MSG5D:  DB 'NO BUFFERS OR NO'
        DB 'EVENTS FOR XFER ',0
MSG6A:  DB '#    UNIT ID=   '
        DB '  /  /     :    ',0
MSG6B:  DB 'NO STORED EVENTS'
        DB '   TO DISPLAY   ',0
MSG7A:  DB 'HIT STEP KEY TO '
        DB 'ERASE ALL EVENTS',0
MSG7B:  DB 'HIT STEP KEY TO '
        DB 'CONFIRM ERASURE ',0
        END
****************************************************************
$PAGINATE
$TITLE (INTINTS - RESET, INTERRUPT, AND INITIALIZATION)
$VERSION (1.00)
```

32.

Case No. COE-440

```
$DATE (09/04/9x)
$PL=60
$PAGEWIDTH=120
$MN (INTINTS)
$ALLPUBLIC
      EXTRN LCDINIT(CODE)
      EXTRN RECVI2C(CODE),XMITI2C(CODE),MAINLIN(CODE)
      EXTRN CBUFIN(CODE)
      EXTRN Q_KEY(NUMBER),Q_POWER(NUMBER),VERSION(NUMBER)
        %INCLUDE "INTXTRN.ASM"
      DEFSEG   REBOOT, START=0, CLASS=CODE
      SEG  REBOOT
      ORG  RESET;ABS AT 0000H
      LJMP V_RESET;RESET
      ORG  EXTI0
      RETI;EXTERNAL INTERRUPT 0 NOT ALLOWED
      ORG  TIMER0
      LJMP V_TIMR0;TIMER 0 INTERRUPT
      ORG  10H
CHKSUM:   DB   0;CHECKSUM ADJUSTMENT
      ORG  EXTI1
      RETI ;EXTERNAL INTERRUPT 1 NOT ALLOWED
      ORG  TIMER1
      RETI ;TIMER 1 INTERRUPT NOT ALLOWED
      ORG  SINT
      RETI ;SERIAL INT NOT ALLOWED
      ORG  30H
      ORG  110H

;************************
TIMER 0 INTERRUPT = 100 Hz
;************************

V_TIMR0   PROC
      USING 1
L?BANK    TEQ  BANK1
      MOV  AR7,PSW
      MOV  PSW,#L?BANK
      MOV  R6,DPH
      MOV  R5,DPL
      MOV  R4,B
      MOV  R3,A
      CLR  TR0
      MOV  A,#LOW(T0RLOAD)
      ADD  A,TL0
      MOV  TL0,A
      MOV  A,#HIGH(T0RLOAD)
      ADDC A,TH0
      MOV  TH0,A
      SETB TR0
      MOV  DPTR,#X_INPUT
      MOVX A,@DPTR
      XRL  A,#11111111B
```

33.

Case No. COE-440

```
        XCH     A,LASTIN
        XRL     A,LASTIN
        MOV     B,A
CHKSTEP:JNB     B.0+K_STEP,DECSTEP
        MOV     D_STEP,#LOW(MAXSW)
        MOV     D_STEP+1,#HIGH(MAXSW)
        CLR     B_TYPSTEP
DECSTEP:MOV     A,D_STEP
        ORL     A,D_STEP+1
        JZ      STEPEND
        MOV     A,D_STEP
        ADD     A,#0FFH
        MOV     D_STEP,A
        JC      CHKSTPB
        DEC     D_STEP+1
        SJMP    STEPEND
CHKSTPB:ORL     A,D_STEP+1
        JNZ     STEPEND
        JNB     LASTIN.0+K_STEP,STEPEND
        JB      B_TYPSTEP,CHKSTPE
        SETB    B_TYPSTEP
        MOV     D_STEP,#LOW(MAXTYP1)
        MOV     D_STEP+1,#HIGH(MAXTYP1)
        SJMP    CHKSTPG
CHKSTPE:MOV     D_STEP,#LOW(MAXTYP2)
        MOV     D_STEP+1,#HIGH(MAXTYP2)
CHKSTPG:MOV     A,#Q_KEY
        MOV     R1,#K_STEP
        LCALL   CBUFIN
STEPEND:
        JNB     B.0+K_ENTER,DECENTR
        MOV     D_ENTR,#LOW(MAXSW)
        MOV     D_ENTR+1,#HIGH(MAXSW)
DECENTR:MOV     A,D_ENTR
        ORL     A,D_ENTR+1
        JZ      ENTREND
        MOV     A,D_ENTR
        ADD     A,#0FFH
        MOV     D_ENTR,A
        JC      CHKNTRB
        DEC     D_ENTR+1
        SJMP    ENTREND
CHKNTRB:ORL     A,D_ENTR+1
        JNZ     ENTREND
        JNB     LASTIN.0+K_ENTER,ENTREND

MOV     A,#Q_KEY
        MOV     R1,#K_ENTER
        LCALL   CBUFIN
ENTREND:
        %FOR J=1 TO 2
                MOV     A,D_TIME&J
                ORL     A,D_TIME&J+1
                JZ      TIMEND&J
                MOV     A,D_TIME&J
                ADD     A,#0FFH
```

34.

Case No. COE-440

```
                MOV     D_TIME&J,A
                JC      CHKT&J&Z
                DEC     D_TIME&J+1
                %IF J LT 3 OR J EQ 5
                SJMP    TIMEND&J
CHKT&J&Z:       ORL     A,D_TIME&J+1
                JNZ     TIMEND&J
                %SWITCH J
                %CASE 2
                MOV     A,#Q_POWER
                LCALL   CBUFIN
                %ENDSW
                %ELSE
CHKT&J&Z:
                %ENDIF
TIMEND&J:
        %ENDFOR
;*********************
EXIT TIMER INTERRUPT
*********************
BUFFEX:         MOV     A,R3
                MOV     B,R4
                MOV     DPL,R5
                MOV     DPH,R6
                MOV     PSW,R7
                RETI
V_TIMR0         ENDPROC
;***************************************************************
MAIN PROGRAM STARTS HERE WITH INITIALIZATION.           *
***************************************************************
V_RESET:CLR     EA
                MOV     PSW,#BANK0
                MOV     P0,#LOW(NULLADDR)
                MOV     P1,#080H
                MOV     P2,#HIGH(NULLADDR)
                MOV     P3,#0FFH
                MOV     R2,#6 ;WAIT 1 SECOND FOR LCD POWER
                MOV     R1,#0
                MOV     R0,#0
PWRWAIT:DJNZ    R0,PWRWAIT
                DJNZ    R1,PWRWAIT
                DJNZ    R2,PWRWAIT
                MOV     R0,#07FH
                CLR     A
RESETLP:MOV     @R0,A
                DJNZ    R0,RESETLP ;CLEAR DRAM AND KILL TIME FROM RESET
                MOV     SP,#STACK-1 ;INITIALIZE STACK POINTER
                MOV     DPTR,#X_INPUT
                MOVX    A,@DPTR
                XRL     A,#11111111B
                MOV     LASTIN,A
                CLR     A
                MOV     D_TIME1,A
                MOV     D_TIME1+1,A
                MOV     D_TIME2,#LOW(PWRTIME) ;LOAD INACTIVITY TIMER
                MOV     D_TIME2+1,#HIGH(PWRTIME)
```

35.

Case No. COE-440

```
        MOV    D_CTCBF,A          ;CLEAR COMMAND BUFFER
        MOV    D_HDCBF,#LOW(X_CBUFF)
        MOV    D_TLCBF,#LOW(X_CBUFF)
        MOV    R7,#LOW(EO_CBUF-X_CBUFF)
        MOV    DPTR,#X_CBUFF
L_LOOP1:MOVX   @DPTR,A;NULL BUFFER VALUES
        INC    DPTR
        DJNZ   R7,L_LOOP1
        LCALL  LCDINIT
        MOV    TH0,#HIGH(T0RLOAD)
        MOV    TL0,#LOW(T0RLOAD)
        MOV    TH1,#LOW(T1RLOAD)
        MOV    TL1,#LOW(T1RLOAD)
        MOV    SCON,#01100000B
        MOV    TMOD,#00100001B
        MOV    IP,#00000000B
        MOV    TCON,#01010000B
        MOV    IE,#00000010B
        SETB   EA
        SJMP   MAINLIN
        END
************************************************************
            ASSEMBLY  LANGUAGE  FOR  RECORDER  UNIT $PAGINATE
$TITLE (RECVARS - VARIABLES)
$VERSION (1.00)
$DATE (08/29/9X)
$PL=60
$PAGEWIDTH=120
$MN (RECVARS)
$ALLPUBLIC
        DEFSEG    SYSBITS, CLASS=BIT, PHANTOM
        SEG       SYSBITS
;*********************
START OF ORDER SPECIFIC VARIABLES
;*********************
B_BATTLOW: DS   1              ;0 => BATTERY IS LOW
B_MANUAL:  DS   1              ;0 => MANUAL RESET SWITCH CAUSED RESET
B_TEST:    DS   1              ;0 => TEST MODE (NOT ARMED)
;******************************
END OF ORDER SPECIFIC VARIABLES
;******************************
B_I2CERR: DS    1              ;1 => I2C FAILURE
B_I2CBSY: DS    1              ;1 => I2C IS BUSY
        ORG     P0.0
I2C_CLK:  DS    1              ;I2C SERIAL PORT CLOCK
I2C_DTA:  DS    1              ;I2C SERIAL PORT DATA
DIPSWITCH:DS    1              ;0 => SUPPLY GROUND TO ID DIP SWITCH
        ORG     P1.0
SPEAKER:  DS    1              ;0 => SPEAKER IS ON
MAN_RESET:DS    1              ;0 => MANUAL RESET OR POWER-ON-RESET
INTCLR:         DS   1         ;0 => PULSE LOW TO CLEAR RESET LATCH
BATTLOW:  DS    1              ;0 => BATTERY VOLTAGE IS LOW
TEST:     DS    1              ;0 => DO NOT RECORD EVENT
        DEFSEG    SYSDATA, START=10H, CLASS=DATA, ABSOLUTE
```

36.

Case No. COE-440

```
        SEG   SYSDATA

;****************************************
 START OF ORDER SPECIFIC VARIABLES
;****************************************
D_EVENT:
D_ID:     DS    1         ;ID OF RECORDER FOR THIS EVENT
MONTH:    DS    1         ;    MONTH
DATE:     DS    1         ;    DATE
YEAR:     DS    1         ;    YEAR
HOUR:     DS    1         ;    HOUR
MIN:      DS    1         ;CURRENT MINUTE
SIZEVNT   EQU   6         ;# OF BYTES NEEDED TO STORE AN EVENT

;****************************************
 END OF ORDER SPECIFIC VARIABLES
;****************************************
D_START:  DS    1         ;ADDRESS OF FIRST EVENT STORAGE BUFFER
D_MAX:    DS    1         ;MAXIMUM # OF EVENTS IN STORAGE BUFFER
D_COUNT:  DS    1         ;# EVENTS STORED
D_HEAD:   DS    1         ;HEAD POINTER TO STORE NEXT EVENT AT
D_TAIL:   DS    1         ;TAIL POINTER TO OLDEST EVENT STORED
D_I2CCT:  DS    1         ;# OF DATA BYTES TO TRANSFER ON I2C BUS
D_I2CSA:  DS    1         ;I2C SLAVE ADDRESS
D_I2CWA:  DS    1         ;I2C WORD ADDRESS
D_BEEPS:  DS    1         ;NUMBER OF TIMES TO BEEP SPEAKER
          ORG   20H
D_BITS:   DS    1         ;DUMMY FILL FOR BIT DATA
D_I2CBF:  DS    20        ;BUFFER FOR I2C DATA
       DEFSEG   SYSTACK, CLASS=IDATA
       SEG      SYSTACK
STACK:    DS    8         ;LOAD SP WITH STACK-1 AT RESET
BANK0     EQU   0*8
I2CFG     EQU   0D8H      ;I2C CONFIG REGISTER
RID8583   EQU   10100000B ;PCF8583 SLAVE ADDRESS
;************************
 NONVOLATILE RAM LAYOUT
;************************
J         TEQ   008H
A_VERSION EQU   J         ;SOFTWARE VERSION THAT CREATED DATA
S_VERSION EQU   2         ;SIZE OF VERSION FIELD
J         TEQ   J+S_VERSION
A_START   EQU   J         ;FIRST ADDRESS OF EVENT DATA
S_START   EQU   1         ;SIZE OF FIRST ADDRESS OF EVENT FIELD
J         TEQ   J+S_START
A_MAX     EQU   J         ;MAXIMUM NUMBER OF BUFFERS
S_MAX     EQU   1         ;SIZE OF MAXIMUM NUMBER OF BUFFERS
J         TEQ   J+S_MAX
A_COUNT   EQU   J         ;NUMBER OF EVENTS STORED
S_COUNT   EQU   1         ;SIZE OF NUMBER OF EVENTS STORED FIELD
J         TEQ   J+S_COUNT
A_HEAD    EQU   J         ;HEAD POINTER TO NEXT ADDRESS TO STORE
S_HEAD    EQU   1         ;SIZE OF HEAD POINTER
J         TEQ   J+S_HEAD
A_TAIL    EQU   J         ;TAIL POINTER TO FIRST EVENT STORED
S_TAIL    EQU   1         ;SIZE OF TAIL POINTER
```

37.

Case No. COE-440

```
J              TEQ    J+S_TAIL
A_BASEYR       EQU    J           ;ACTUAL YEAR TIME WAS SET (0-99)
S_BASEYR       EQU    1           ;SIZE OF BASE YEAR FIELD
J              TEQ    J+S_BASEYR
A_PROGYR       EQU    J               ;YEAR (0-3) PROGRAMMED INTO PCF8583
S_PROGYR       EQU    1               ;SIZE OF PROGRAMMED YEAR FIELD
J              TEQ    J+S_PROGYR
A_LATER        EQU    J               ;SAVED FOR LATER EXPANSION
S_LATER        EQU    8               ;SIZE OF LATER EXPANSION FIELD
J              TEQ    J+S_LATER
MAXEVNT        EQU    (256-J)/SIZEVNT ;MAXIMUM NUMBER OF EVENTS
A_EVENT        EQU    J               ;EVENT STORAGE
S_EVENT        EQU    SIZEVNT*MAXEVNT ;SIZE OF EVENT STORAGE
J              TEQ    J+S_EVENT
               END
;********************************************************
       EXTRN
TEST(BIT),SPEAKER(BIT),INTCLR(BIT),BATTLOW(BIT),MAN_RESET(BIT)
       EXTRN B_BATTLOW(BIT),B_MANUAL(BIT),B_TEST(BIT),DIPSWITCH(BIT)
       EXTRN B_I2CERR(BIT),B_I2CBSY(BIT),I2C_DTA(BIT),I2C_CLK(BIT)
       EXTRN D_I2CCT(DATA),D_I2CSA(DATA),D_I2CWA(DATA),D_I2CBF(DATA)
       EXTRN MIN(DATA),HOUR(DATA),DATE(DATA),MONTH(DATA),YEAR(DATA)
       EXTRN D_EVENT(DATA),D_ID(DATA),D_START(DATA),D_BITS(DATA),D_M
(DATA)
       EXTRN D_COUNT(DATA),D_HEAD(DATA),D_TAIL(DATA),D_BEEPS(DATA)
       EXTRN STACK(IDATA)
       EXTRN BANK0(NUMBER)
       EXTRN A_VERSION(NUMBER),A_BASEYR(NUMBER),A_PROGYR(NUMBER)
       EXTRN S_VERSION(NUMBER),S_BASEYR(NUMBER),S_PROGYR(NUMBER)
       EXTRN A_EVENT(NUMBER),A_START(NUMBER),A_MAX(NUMBER)
       EXTRN S_EVENT(NUMBER),S_START(NUMBER),S_MAX(NUMBER)
       EXTRN A_COUNT(NUMBER),A_HEAD(NUMBER),A_TAIL(NUMBER)
       EXTRN S_COUNT(NUMBER),S_HEAD(NUMBER),S_TAIL(NUMBER)
       EXTRN SIZEVNT(NUMBER),MAXEVNT(NUMBER)
       EXTRN I2CFG(NUMBER),RID8583(NUMBER)
;*******************************************
;* THIS MACRO TESTS THE I2C ERROR FLAG.;*
;*******************************************
ERRTEST        %MACRO
$NOALLPUBLIC
       %LOCAL    ADDR
       JNB   B_I2CERR,ADDR
       AJMP  I2CERR
ADDR:
$ALLPUBLIC
       %ENDM
;*************************************************************
$PAGINATE
$TITLE (RECSUBS - SUBROUTINES FOR RECORDERS)
$VERSION (1.00)
$DATE (08/29/9X)
$PL=60
$PAGEWIDTH=120
```

Case No. COE-440

```
$MN (RECSUBS)
$ALLPUBLIC
     EXTRN RECVI2C(CODE),XMITI2C(CODE)
     EXTRN BCD2HEX(CODE)
     EXTRN VERSION(NUMBER)
       %INCLUDE "RECXTRN.ASM"
     DEFSEG   MAINSYS
     SEG  MAINSYS
;****************************************************************
THIS SUBROUTINE STORES THE EVENT IN THE NEXT AVAILABLE BUFFER.
;****************************************************************
STORE PROC
     MOV   D_I2CSA,#RID8583;SLAVE ADDRESS OF PCF8583 RAM
     MOV   A,D_HEAD   ;CALCULATE ADDRESS TO STORE EVENT AT
     MOV   B,#SIZEVNT
     MUL   AB
     ADD   A,D_START
     MOV   D_I2CWA,A   ;WORD ADDRESS OF 8583
     MOV   R0,#D_EVENT            ;ADDRESS OF DATA
     MOV   D_I2CCT,#SIZEVNT       ;NUMBER OF BYTES TO TRANSFER
     ACALL XMITI2C                ;STORE EVENT
     INC   D_HEAD
     MOV   A,D_HEAD
     ADD   A,#-(MAXEVNT)
     JNC   L_HDOK
     MOV   D_HEAD,#0
L_HDOK:   INC  D_COUNT; UPDATE NUMBER OF EVENTS STORED
     MOV   A,D_COUNT
     ADD   A,#-(MAXEVNT+1)
     JNC   L_CTOK
     MOV   D_COUNT,#MAXEVNT
     INC   D_TAIL
     MOV   A,D_TAIL
     ADD   A,#-(MAXEVNT)
     JNC   L_TLOK
     MOV   D_TAIL,#0
L_TLOK:
L_CTOK:
L?EXIT:   RET
STORE ENDPROC
;****************************************************************
THIS SUBROUTINE READS THE TIME OF DAY DATA FROM THE 8583.
;****************************************************************
READCLK   PROC
     MOV   D_I2CSA,#RID8583;SLAVE ADDRESS OF PCF8583 RAM
     MOV   D_I2CBF,#01000000B
     MOV   D_I2CWA,#0 ;WORD ADDRESS OF 8583
     MOV   R0,#D_I2CBF;ADDRESS OF DATA
     MOV   D_I2CCT,#1 ;NUMBER OF BYTES TO TRANSFER
     ACALL XMITI2C   ;STORE/HOLD LAST COUNT
     JB    B_I2CERR,L?ERROR
     MOV   D_I2CWA,#2 ;WORD ADDRESS OF 8583
     MOV   D_I2CCT,#0 ;NUMBER OF BYTES TO TRANSFER
     ACALL XMITI2C
     MOV   R0,#D_I2CBF;BUFFER TO READ DATA INTO
     MOV   D_I2CCT,#5 ;NUMBER OF BYTES TO TRANSFER
```

39.

Case No. COE-440

```
        ACALL RECVI2C    ;READ TIME AND DATE
        JB     B_I2CERR,L?ERROR
        MOV    D_I2CBF+5,#0
        MOV    D_I2CWA,#0;WORD ADDRESS OF 8583
        MOV    R0,#D_I2CBF+5;ADDRESS OF DATA
        MOV    D_I2CCT,#1; NUMBER OF BYTES TO TRANSFER
        ACALL XMITI2C; ENABLE COUNTING AGAIN
        JB     B_I2CERR,L?ERROR
        MOV    D_I2CWA,#A_BASEYR;WORD ADDRESS OF 8583
        MOV    D_I2CCT,#0 ;NUMBER OF BYTES TO TRANSFER
        ACALL XMITI2C
        MOV    R0,#D_I2CBF+5   ;BUFFER TO READ BASE YEAR DATA INTO
        MOV    D_I2CCT,#S_BASEYR ;NUMBER OF BYTES TO TRANSFER
        ACALL RECVI2C ;READ BASE YEAR
        JB     B_I2CERR,L?ERROR
        MOV    D_I2CWA,#A_PROGYR;WORD ADDRESS OF 8583
        MOV    D_I2CCT,#0 ;NUMBER OF BYTES TO TRANSFER
        ACALL XMITI2C
        MOV    R0,#D_I2CBF+6;BUFFER TO READ BASE YEAR DATA INTO
        MOV    D_I2CCT,#S_PROGYR;NUMBER OF BYTES TO TRANSFER
        ACALL RECVI2C;READ PROGRAMMED YEAR
        JNB    B_I2CERR,L?OK
L?ERROR:AJMP   L?EXIT
L?OK:   MOV    A,D_I2CBF+1
        MOV    MIN,A
        MOV    A,D_I2CBF+2
        ANL    A,#00111111B
        MOV    HOUR,A
        MOV    A,D_I2CBF+3
        ANL    A,#00111111B
        MOV    DATE,A
        MOV    A,D_I2CBF+4
        ANL    A,#00011111B
        MOV    MONTH,A
        MOV    A,D_I2CBF+3
        RL     A
        RL     A
        ANL    A,#00000011B
        CLR    C
        SUBB   A,D_I2CBF+6
        JNC    L?FIXYR
        ADD    A,#4
L?FIXYR:ADD    A,D_I2CBF+5
        DA     A
        MOV    YEAR,A
L?EXIT: RET
        READCLK    ENDPROC
;*****************************************************************
THIS SUBROUTINE RE-INITIALIZES THE DATA IN THE 8583 RAM.
;*****************************************************************
REINIT  PROC
        MOV    D_I2CSA,#RID8583     ;SLAVE ADDRESS OF PCF8583 RAM
        MOV    D_I2CBF+0,#LOW(VERSION)
        MOV    D_I2CBF+1,#HIGH(VERSION)
        MOV    D_I2CWA,#A_VERSION ;WORD ADDRESS OF 8583
        MOV    R0,#D_I2CBF;ADDRESS OF DATA
```

40.

Case No. COE-440

```
        MOV    D_I2CCT,#S_VERSION ;NUMBER OF BYTES TO TRANSFER
        ACALL  XMITI2C ;STORE EPROM VERSION
        MOV    D_START,#A_EVENT
        MOV    D_I2CWA,#A_START;WORD ADDRESS OF 8583
        MOV    R0,#D_START;ADDRESS OF DATA
        MOV    D_I2CCT,#S_START;NUMBER OF BYTES TO TRANSFER
        ACALL  XMITI2C;INITIALIZE POINTER TO FIRST BUFFER
        MOV    D_MAX,#MAXEVNT
        MOV    D_I2CWA,#A_MAX;WORD ADDRESS OF 8583
        MOV    R0,#D_MAX  ;ADDRESS OF DATA
        MOV    D_I2CCT,#S_MAX;NUMBER OF BYTES TO TRANSFER
        ACALL  XMITI2C;INITIALIZE NUMBER OF BUFFERS
        MOV    D_COUNT,#0
        MOV    D_I2CWA,#A_COUNT;WORD ADDRESS OF 8583
        MOV    R0,#D_COUNT;ADDRESS OF DATA
        MOV    D_I2CCT,#S_COUNT;NUMBER OF BYTES TO TRANSFER
        ACALL  XMITI2C;INITIALIZE NUMBER OF EVENTS STORED
        MOV    D_HEAD,#0
        MOV    D_I2CWA,#A_HEAD ;WORD ADDRESS OF 8583
        MOV    R0,#D_HEAD;ADDRESS OF DATA
        MOV    D_I2CCT,#S_HEAD ;NUMBER OF BYTES TO TRANSFER
        ACALL  XMITI2C;INITIALIZE HEAD POINTER
        MOV    D_TAIL,#0
        MOV    D_I2CWA,#A_TAIL ;WORD ADDRESS OF 8583
        MOV    R0,#D_TAIL ;ADDRESS OF DATA
        MOV    D_I2CCT,#S_TAIL ;NUMBER OF BYTES TO TRANSFER
        ACALL  XMITI2C;INITIALIZE TAIL POINTER
        RET
REINIT  ENDPROC
;*****************************************************************
; THIS SUBROUTINE DELAYS R3/20 SECONDS @ 3.58 MHz.
;*****************************************************************
DELAY PROC
        MOV    A,R5
        PUSH   ACC
        MOV    A,R6
        PUSH   ACC
L?LOOP1:MOV    R5,#29
        MOV    R6,#0
L?LOOP2:DJNZ   R6,$
        DJNZ   R5,L?LOOP2
        DJNZ   R4,L?LOOP1
        POP    ACC
        MOV    R6,A
        POP    ACC
        MOV    R5,A
        RET
DELAY ENDPROC
        END
*****************************************************************
$PAGINATE
$TITLE (RECINTS - RESET, INTERRUPT, AND INITIALIZATION)
$VERSION (1.00)
$DATE (08/24/9X)
$PL=60
$PAGEWIDTH=120
```

41.

Case No. COE-440

```
$MN (RECINTS)
$ALLPUBLIC
    EXTRN REINIT(CODE),DELAY(CODE),READCLK(CODE),STORE(CODE)
    EXTRN RECVI2C(CODE),XMITI2C(CODE)
      %INCLUDE "RECXTRN.ASM"
    DEFSEG    REBOOT, START=0, CLASS=CODE
    SEG    REBOOT
    ORG    RESET;ABS AT 0000H
    AJMP   V_RESET;RESET
    ORG    EXTI0
    RETI;EXTERNAL INTERRUPT 0 NOT ALLOWED
    ORG    TIMER0
    RETI ;TIMER 0 INTERRUPT NOT ALLOWED
    ORG    EXTI1
    RETI;EXTERNAL INTERRUPT 1 NOT ALLOWED
    ORG    TIMER1
    RETI;TIMER 1 INTERRUPT NOT ALLOWED
    ORG    SINT
    RETI            ;SERIAL INT NOT ALLOWED
    ORG    30H
VERSION    EQU  100
    DB    '****************'
    DB    'EVENT REC. V',(VERSION/100)+30H,'.',((VERSION MOD
100)/10)+30H,(VERSION MOD 10)+30H
;*********************************************
MAIN PROGRAM STARTS HERE WITH INITIALIZATION;
;*********************************************
V_RESET:CLR   EA
    MOV    PSW,#BANK0
    MOV    P0,#0FBH
    MOV    P1,#0FFH
    MOV    P3,#0FFH
    MOV    R0,#63
    CLR    A
RESETLP:MOV @R0,A
    DJNZ R0,RESETLP ;CLEAR DRAM AND KILL TIME FROM RESET
    MOV    SP,#STACK-1;INITIALIZE STACK POINTER
    MOV    I2CFG,#00000000B      ;DISABLE HARDWARE I2C FEATURE
    MOV    TCON,#00000000B
    MOV    IE,#00000000B;NO INTERRUPTS NEEDED
    MOV    C,MAN_RESET;GET STATUS OF RESET CAUSE
    MOV    B_MANUAL,C;AND STORE
    MOV    C,TEST;GET STATUS OF ARM/TEST SWITCH
    MOV    B_TEST,C;AND STORE
    MOV    C,BATTLOW;GET STATUS OF BATTERY
    MOV    B_BATTLOW,C ;AND STORE
    CLR    A
    CPL    C
    MOV    ACC.0,C
    INC    A
    MOV    D_BEEPS,A
    MOV    D_ID,P3 ;STORE RECORDER'S ID IN EVENT
    SETB   DIPSWITCH ;DISABLE DIP SWITCH GROUND
    MOV    D_I2CSA,#RID8583     ;SLAVE ADDRESS OF PCF8583 RAM
    MOV    D_I2CWA,#A_START;WORD ADDRESS OF 8583
    MOV    D_I2CCT,#0;NUMBER OF BYTES TO TRANSFER
```

42.

Case No. COE-440

```
        ACALL XMITI2C
ERRTEST MOV R0,#D_START ;BUFFER TO READ DATA INTO
        MOV  D_I2CCT,#S_START    ;NUMBER OF BYTES TO TRANSFER
        ACALL RECVI2C ;READ OFFSET OF EVENT BUFFER
        ERRTEST
        MOV  D_I2CWA,#A_COUNT; WORD ADDRESS OF 8583
        MOV  D_I2CCT,#0; NUMBER OF BYTES TO TRANSFER
        ACALL XMITI2C
        ERRTEST
        MOV  R0,#D_COUNT; BUFFER TO READ DATA INTO
        MOV  D_I2CCT,#S_COUNT; NUMBER OF BYTES TO TRANSFER
        ACALL RECVI2C ;READ NUMBER OF EVENTS STORED IN BUFFER
        ERRTES
        MOV  D_I2CWA,#A_HEAD ; WORD ADDRESS OF 8583
        MOV  D_I2CCT,#0; NUMBER OF BYTES TO TRANSFER
        ACALL XMITI2C
        ERRTEST
        MOV  R0,#D_HEAD ;BUFFER TO READ DATA INTO
        MOV  D_I2CCT,#S_HEAD ;NUMBER OF BYTES TO TRANSFER
        ACALL RECVI2C ;READ HEAD POINTER TO STORE NEXT EVENT
        ERRTEST
        MOV  D_I2CWA,#A_TAIL; WORD ADDRESS OF 8583
        MOV  D_I2CCT,#0; NUMBER OF BYTES TO TRANSFER
        ACALL XMITI2C
        ERRTEST
        MOV  R0,#D_TAIL ;BUFFER TO READ DATA INTO
        MOV  D_I2CCT,#S_TAIL ;NUMBER OF BYTES TO TRANSFER
        ACALL RECVI2C ;READ TAIL POINTER OF FIRST EVENT STORED
        ERRTEST
TEST1:  MOV  A,D_BITS
        ANL  A,#00000111B
        CJNE A,#1,VALID      ;TEST FOR REINIT REQUEST
NOVALID:ACALL  REINIT ;REINITIALIZE THE DATA IN THE 8583 RAM
        ERRTEST
        AJMP SNDSPKR
VALID:  ANL  A,#2
        CJNE A,#2,SNDSPKR
        ACALL READCLK ;READ CLOCK DATA FROM 8583
        ERRTEST
        ACALL STORE
        ERRTEST
        MOV  D_I2CWA,#A_COUNT;WORD ADDRESS OF 8583
        MOV  R0,#D_COUNT;BUFFER TO READ DATA INTO
        MOV  D_I2CCT,#S_COUNT;NUMBER OF BYTES TO TRANSFER
        ACALL XMITI2C;WRITE NUMBER OF EVENTS STORED
        ERRTEST
        MOV  D_I2CWA,#A_HEAD ;WORD ADDRESS OF 8583
        MOV  R0,#D_HEAD  ;BUFFER TO READ DATA INTO
        MOV  D_I2CCT,#S_HEAD ;NUMBER OF BYTES TO TRANSFER
        ACALL XMITI2C;WRITE HEAD POINTER
        ERRTEST
        MOV  D_I2CWA,#A_TAIL ;WORD ADDRESS OF 8583
        MOV  R0,#D_TAIL ;BUFFER TO READ DATA INTO
        MOV  D_I2CCT,#S_TAIL ;NUMBER OF BYTES TO TRANSFER
        ACALL XMITI2C ;WRITE TAIL POINTER
        JNB  B_I2CERR,SNDSPKR
```

43.

Case No. COE-440

```
I2CERR:MOV D_BEEPS,#3
SNDSPKR:SJMP SPKRON
SPKROFF:MOV R4,#20
       ACALL DELAY
SPKRON:CLR SPEAKER;TURN ON BUZZER
       MOV R4,#1
       ACALL DELAY
       SETB SPEAKER;TURN OFF BUZZER
       DJNZ D_BEEPS,SPKROFF
PWROFF:CLR INTCLR;CLEAR LATCH
       NOP
       NOP
       NOP
       SETB INTCLR;ALLOW NEW RESET
;*****************************************************************
THIS NEXT BLOCK OF CODE CAN BE USED TO READ THE FIRST THREE EVENTS
*****************************************************************
       MOV  D_I2CWA,#A_EVENT;WORD ADDRESS OF 8583
       MOV  D_I2CCT,#0 ;NUMBER OF BYTES TO TRANSFER
       ACALL XMITI2C
       MOV  R0,#D_I2CBF;BUFFER TO READ DATA INTO
       MOV  D_I2CCT,#18;NUMBER OF BYTES TO TRANSFER
       ACALL RECVI2C;READ OFFSET OF EVENT BUFFER
       MOV  PCON,#0FFH;PUT CPU IN POWER DOWN MODE
WAIT: SJMP $
       END
*****************************************************************
```

We claim:

1. A self-contained data acquisition apparatus comprising:

an environmentally sealed housing for an event recorder device of dates and times by sensing opening of at least one external trigger circuit to the recorder device, dimension of the recorder device constructed dimensionally for hand-held use the housing including:
 a) a processor means for controlling operation of the recorded device wherein the processor means includes a preprogrammed read only memory (ROM) containing control instructions for the recorder device;
 b) a regulated power means for powering the recorded device, the regulated power means is a powered by a battery;
 c) a clock/calender means that includes random access memory (RAM) for storage of the dates and times of events caused by interruption of the at least one external trigger circuit;
 d) a timing and control interface means for: I) interfacing with the at least one trigger circuit, ii) generating and controlling a timed voltage pulse which test the integrity of the state of the at least one trigger circuit, the at least one trigger circuit's length determines the pulse's return time and thus by sensing said return time optimally conserves the recorder battery, and iii) controlling power flow to the processor means; and
 e) an interrogation interface means for communicating data to and from the recorder device.

2. The recorder device of claim 1 wherein the timing and control interface means includes:
 a. an oscillator in combination with a ripple counter;
 b. a watchdog timer/power monitor component;
 c. a status latch component;
 d. a state change detector; and
 e. logic circuit means for generating control signals for power flow control to the processor means.

3. The recorder device according to claim 1 wherein the at least one external triggering circuit to the recorder device is an ice motion detector.

4. The recorder device according to claim 1 wherein the at least one external triggering circuit to the recorder device is a magnetic switch.

5. The recorder device according to claim 1 wherein the at least one external triggering circuit to the recorder device is an infrared switch.

6. The data acquisition apparatus of claim 1 that further comprises an interrogation device for use with the recorder device for retrieving data of the dates and times of the at least one trigger circuit opening, the interrogation device is contained in an environmentally sealed housing, the housing including:
 a. a second processor means for controlling operation of the interrogation device wherein the second processor means includes a second preprogrammed ROM containing control instructions for the second processor;
 b. a second regulated power means for power of the interrogation device, the second regulated power means is powered by a battery;
 c. a second clock/calender means;
 d. a bus arbitration selection means for input/output control from the interrogation device;
 e. a recorder interface means for communicating data to and from the recorder device; and
 f. an event storage RAM means.

7. The recorder device according to claim 6 wherein the processor means includes an identification dip-switch for identification of the recorder device whereby the interrogation device in a collecting data mode from a recorder device can uniquely identify a particular recorder device.

8. The recorder device according to claim 6 wherein the clock/calender means is presettable and programmed by the interrogator device's second clock/calender means by the second processor means when both devices are connected thereby synchronizing both device's time and date.

9. The interrogation device of claim 6 that further comprises a keyboard means and a liquid crystal display means.

10. The interrogation device of claim 6 that further comprises an RS-232 port for data communications with a personal computer.

* * * * *